(12) United States Patent
Dickinson et al.

(10) Patent No.: US 7,251,386 B1
(45) Date of Patent: Jul. 31, 2007

(54) INTEGRATED PHOTONIC-ELECTRONIC CIRCUITS AND SYSTEMS

(75) Inventors: Alexander G. Dickinson, Laguna Beach, CA (US); Lawrence C. Gunn, III, Altadena, CA (US); Andrew Shane Huang, Cardiff by the Sea, CA (US); Philip M. Neches, Summit, NJ (US)

(73) Assignee: Luxtera, Inc, Carlsbad, CA (US)

( * ) Notice: Subject to any disclaimer, the term of this patent is extended or adjusted under 35 U.S.C. 154(b) by 178 days.

(21) Appl. No.: 10/758,561

(22) Filed: Jan. 14, 2004

(51) Int. Cl.
*G02B 6/12* (2006.01)

(52) U.S. Cl. .............................. 385/14; 385/88; 385/92; 385/49; 385/129; 385/130; 385/131; 385/24

(58) Field of Classification Search ................. 385/14, 385/31, 37, 88, 89, 92, 42, 129, 130, 131, 385/132, 15, 16, 24, 49
See application file for complete search history.

(56) References Cited

U.S. PATENT DOCUMENTS

| | | | | |
|---|---|---|---|---|
| 5,163,118 A | * | 11/1992 | Lorenzo et al. | 385/132 |
| 5,353,033 A | * | 10/1994 | Newberg et al. | 342/375 |
| 5,559,912 A | * | 9/1996 | Agahi et al. | 385/42 |
| 6,088,376 A | | 7/2000 | O'Brien et al. | 372/50 |
| 6,468,823 B1 | | 10/2002 | Scherer et al. | 438/31 |
| 6,643,439 B2 | | 11/2003 | Notomi et al. | 385/125 |
| 6,649,439 B1 | | 11/2003 | Nesnidal et al. | 438/22 |
| 2003/0026556 A1 | * | 2/2003 | Mazotti et al. | 385/92 |
| 2005/0078902 A1 | * | 4/2005 | Beausoleil et al. | 385/1 |

OTHER PUBLICATIONS

"Scaling Optoelectronic—VLSI Circuits into the 21st Century: A Technology Roadmap". Ashok V. Krishnamoorthy, Member, IEEE, and David A. B. Miller, Fellow IEEE; IEEE Journal of Selected Topics in Quatum Electronics, vol. 2, No. 1, Apr. 1996.

"Optical Interconnects to Silicon". David A. B. Miller IEEE Journal on Selected Topics in Quantum Electronics vol. 6. No. 6. Nov./Dec. 2000.

"Challenges in Optically Interconnecting Electronics" Frank A. P. Tooley, Member, IEEE. IEEE Journal of Selected Topics in Quantum Electronics vol. 2, No. 1. Apr. 1996.

"Optical Interconnects: Out of the Box Forever?" Dawei Huang, Member, IEEE, Theresa Sze, Member, IEEE. Anders Landin, Rick Lytel, Member IEEE. and Howard L. Davidson, Senior Member, IEEE.

"Very Short Reach Optical Interconnects in Systems: The Case for Fiber-to-the-Processor". The University of Southern California; http://www.usc.edu/alevi; A. F .J. Levi; Optical Digital Communication Seminar on May 21, 2001.

(Continued)

*Primary Examiner*—Brian M. Healy
(74) *Attorney, Agent, or Firm*—Fernandez & Associates, LLP

(57) ABSTRACT

Photonic interconnect reconfigurably couples integrated circuits such as microprocessor, memory or other logic components. Detector, modulator, broad-band coupler and waveguide elements provide transmit and receive capability on CMOS substrate. Computer-implemented design software and reusable component library automate photonic and circuit design and simulation for manufacturability.

82 Claims, 26 Drawing Sheets

OTHER PUBLICATIONS

"High-Speed Optoelectronic VLSI Switching Chip With >4000 Optical I/O Based on Flip-Chip Bonding of MQW Modulators and Detectors to Silicon CMOS." Anthony L. Lentine, Keith W. Goossen, J. A. Walker Leo, Arthur D'Asaro, P. Hui, B. J. Tseng, R. E. Leibenguth, J. E. Cunningham, W. Y. Jan, Jen-Ming Kuo, D. W. Dahringer, D. P. Kossives.

Heterogeneous Integration of OE Arrays With Si Electronics and Microoptics: Yue Liu; IEEE Transactions on Advanced Packaging, vol. 25. No. 1. Feb. 2002.

"Fiber Weighed for Chip Interconnect", www.cmpnet.com. by Anthony Cataldo, Oct. 12, 2001; URL:http://www.eetimes.com/story/OEG2001101250061.

"Evaluation of Advanced Optoelectronic Interconnect Technology" by Janice Onanian McMahon; Tom Emberley; MIT Lincoln Laboratory; Jul. 30, 2001.

"Prospects of CMOS Technology for High Speed Optical Communication Circuit". Behzad Razavi, Senior Member, IEEE; IEEE Journal of Solid-State Circuits, vol. 37, No. 9. Sep. 2002.

"Advance in Silicon-on-Insulator Optoelectronics." B. Jalali, S. Yegnanarayanan, T. Yoon, T. Yoshimoto, I. Rendina, and F. Coppinger. IEEE Journal on Selected Topics in Quantum Electronics vol. 4. No. 6. Nov./Dec. 1998.

"Integrated Optics in Silicon and SiGe-Heterostructures" Schüppert, et al; Journal of Lightwave Technology vol. 14. No. 10, Oct. 1996.

"Nanotaper for Compact Mode Conversion"; Almeida, et al; Optics Letters/vol. 28 No. 15/Aug. 1, 2003.

"Ultra-Low Loss Photonic Integrated Circuit With Membrane-Type Photonic Crystal Waveguides." Nov. 3, 2003/vol. 11, No. 22/Optics Express 2927. Sharee J. McNab, Nikolaj Moll, and Yuril A Vlasov.

* cited by examiner

INTEGRATED PHOTONIC-ELECTRONIC CIRCUITS AND SYSTEMS

CROSS-REFERENCE TO RELATED APPLICATIONS

This application claims a benefit of priority from U.S. Non-provisional application Ser. No. 10/606,297 filed Jun. 24, 2003, the entire contents of which is hereby expressly incorporated by reference.

FIELD OF INVENTION

Invention relates to integrated circuits, particularly circuits with electronic and photonic portions on the same chip.

BACKGROUND OF INVENTION

The rapid expansion in the use of the Internet and data-intensive applications such as machine-vision, video conferencing, and real-time image processing have created a need for communication conduits and devices capable of handling large amounts of data at very high speeds. These applications might need data rates with an order of magnitude of a terabyte per second. Traditional wire-based connections, however optimized, have proven physically incapable of supporting such data rates at acceptable power consumption levels and/or without unacceptable constraints on packaging and/or cost. As a result, electrical wiring has become a significant bottleneck in communication between networks, devices and components in devices.

SUMMARY OF INVENTION

Integrated photonic-electronic circuit chips having a photonic portion and an electronic portion may be implemented using group IV containing materials. Optical signal transmission and/or reception capabilities may be implemented on the same chip as electronic logic devices. In some cases, the electronic portion may be used to configure and/or manage the optical portion. In some cases, the integrated photonic-electronic circuit chips may be remotely and/or automatically reconfigurable; some implementations may be introspective. Novel systems may be created by optically coupling two or more integrated photonic-electronic circuit chips. Optionally, integrated photonic-electronic chips may further comprise electrical connections for transmitting and/or receiving electrical signals, providing additional flexibility and functionality. An integrated photonic-electronic design automation tool supports the design, definition and verification of circuit systems with integrated photonic-electronic chips. A multi-chip module (MCM) layout system supports the layout and optimization of MCMs that include photonic-electronic chips.

DETAILED DESCRIPTION OF PREFERRED EMBODIMENTS

Figure 1:
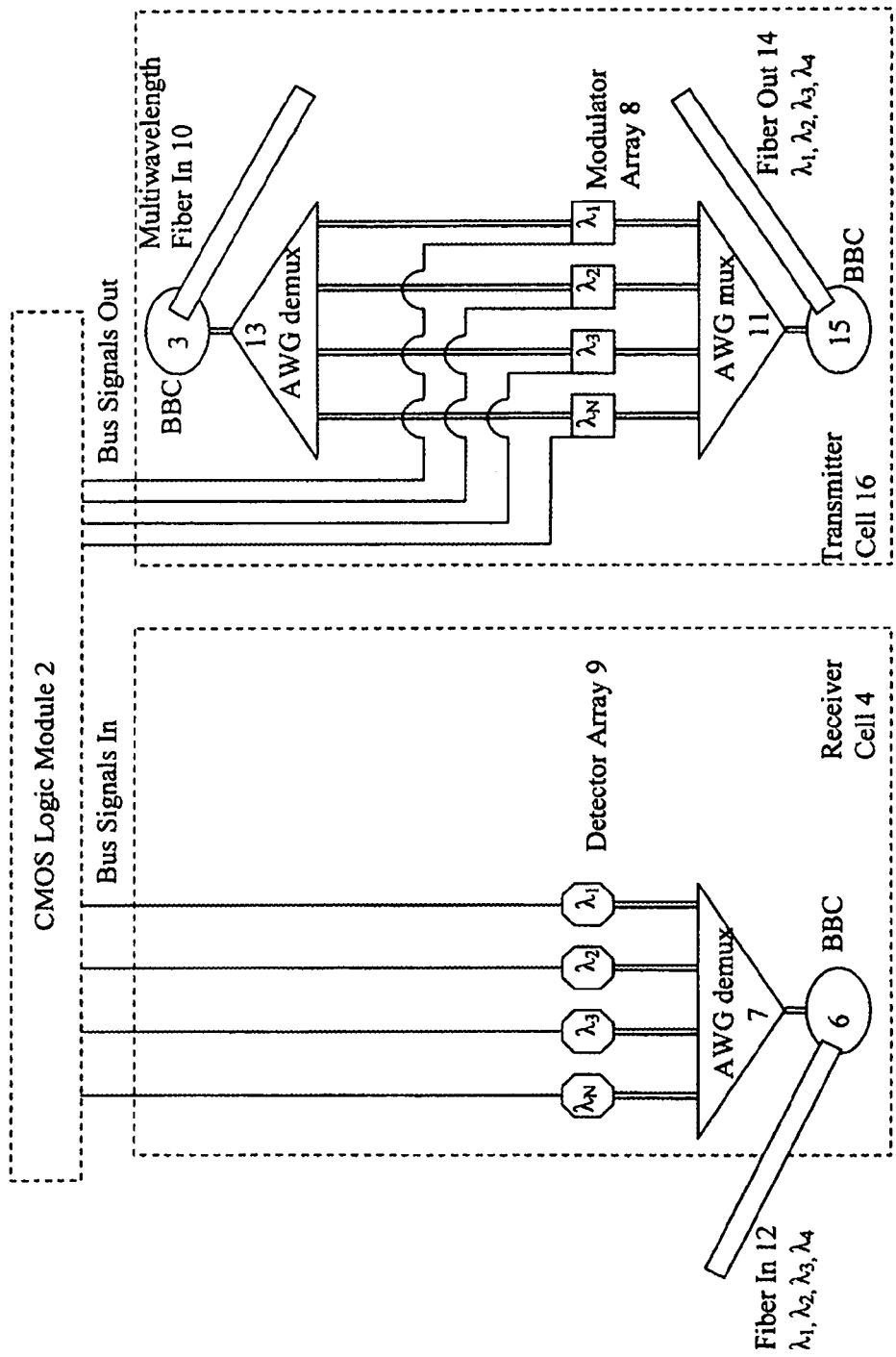
FIG. 1 illustrates an example of an integrated photonic-electronic circuit according to the current invention.

FIG. 1 illustrates an example of an integrated photonic-electronic circuit according to the current invention. In this example, electronic circuit portion 2 is a Complementary Metal Oxide Semiconductor (CMOS) logic module. In other examples, the electronic circuit portion may comprise a variety of electronic components comprising a layer of group IV semiconductor materials such as silicon (Si) and/or germanium (Ge). In some cases, both silicon and germanium may be present; for example, some electronic components may comprise silicon-germanium (Si—Ge) solid solutions and/or superlattices comprising silicon and germanium. Examples of electronic components include, but are not limited to, processors, memory modules, analog circuits, Radio Frequency (RF) circuits, memory controllers, One-Time Programmable (OTP) and/or reconfigurable Programmable Logic Devices (PLD), Complex Programmable Logic Devices (CPLD) and/or Field Programmable Gate Arrays (FPGA). Furthermore, the electronic circuit portion of an integrated photonic-electronic circuit may be manufactured using a variety of different technologies compatible with silicon (Si) processing such as, but not limited to, Bipolar CMOS (Bi-CMOS), Hetero-Junction Biploar Transistor (HBT) and/or Silicon on Insulator (SOI) processes. An integrated photonic-electronic circuit according to the current invention further comprises a photonic portion. A photonic portion comprises one or more optical elements containing silicon. According to the current invention, some of the silicon-containing optical elements in the photonic portion may be transparent to light with an energy less than the bandgap energy of the layer of group IV semiconductor material in the electronic circuit portion. For example, for an integrated photonic-electronic circuit where the electronic portion contains a layer of Si semiconductor material, the photonic portion may be transparent to light with wavelengths over 1.1 micron at room temperature. According to the current invention, optical signals and/or power may be confined in silicon containing waveguides using cladding materials such as, but not limited to, doped and/or undoped silicon oxide ($SiO_x$), silicon oxide-silicon nitride ($SiO_x$—$SiN_y$), silicon nitride ($SiN_y$), silicon oxide nitride ($SiO_xN_y$) and/or non-native dielectrics. These waveguides and/or other optical elements may be deployed to process light substantially in the plane of the circuit. For example, a waveguide may process light substantially in the plane of the circuit by transmitting light substantially in the plane of the circuit. The amount of oxygen and/or nitrogen contained in the cladding layers and/or the amount and type of dopants incorporated into the cladding layers may be related to a variety of parameters such as, but not limited to: the desired electrical and/or optical properties, process parameters and/or the method of manufacture. According to the current invention, the silicon containing waveguide may be doped or undoped. For example, in some cases, a silicon waveguide may be doped with Erbium (Er). In some cases, a silicon containing waveguide may be a polycrystalline silicon (poly-Si) strip loaded waveguide, having narrow strip of deposited poly-Si defining a weak waveguide core. Another example of a silicon containing waveguide is a photonic bandgap waveguide; for example, forbidden bands may be established in a silicon-containing photonic bandgap waveguide by etching holes in silicon material and confining light to a waveguide channel based on the precise spacing and size of the etched holes. In some cases, the photonic portion may comprise one or more optical elements containing germanium such as, but not limited to, germanium detectors. In the example illustrated in FIG. 1, the photonic portion is a photonic interface wherein waveguides, an Arrayed WaveGuide (AWG) multiplexer and Arrayed WaveGuide (AWG) demultiplexers are Si—$SiO_x$ optical elements. However, other examples according to the current invention may contain silicon-containing optical elements such as, but not limited to, optical filters, optical multiplexers, optical demultiplexers, add/drop filters, waveguide-based optical filters, ring resonator multiplexers and ring resonator demultiplexers. In the example illustrated in FIG. 1, narrow Si—$SiO_x$ waveguides with a high contrast between the index of refraction of the Si containing waveguide core and the $SiO_x$ waveguide cladding may be manufactured on-chip; to maintain substantially single mode operation, the width of the single mode optical waveguides may be designed with dimensions of the same order of magnitude as the wavelength of the confined light. In this case, the single mode optical waveguide width dimensions would be consistent with Si VLSI processing such as 0.13 micron (μ) or 0.18μ processes. However, other examples according to the current invention may use different cladding layer materials, linewidth processes and/or different waveguide dimensions.

Figure 2A:
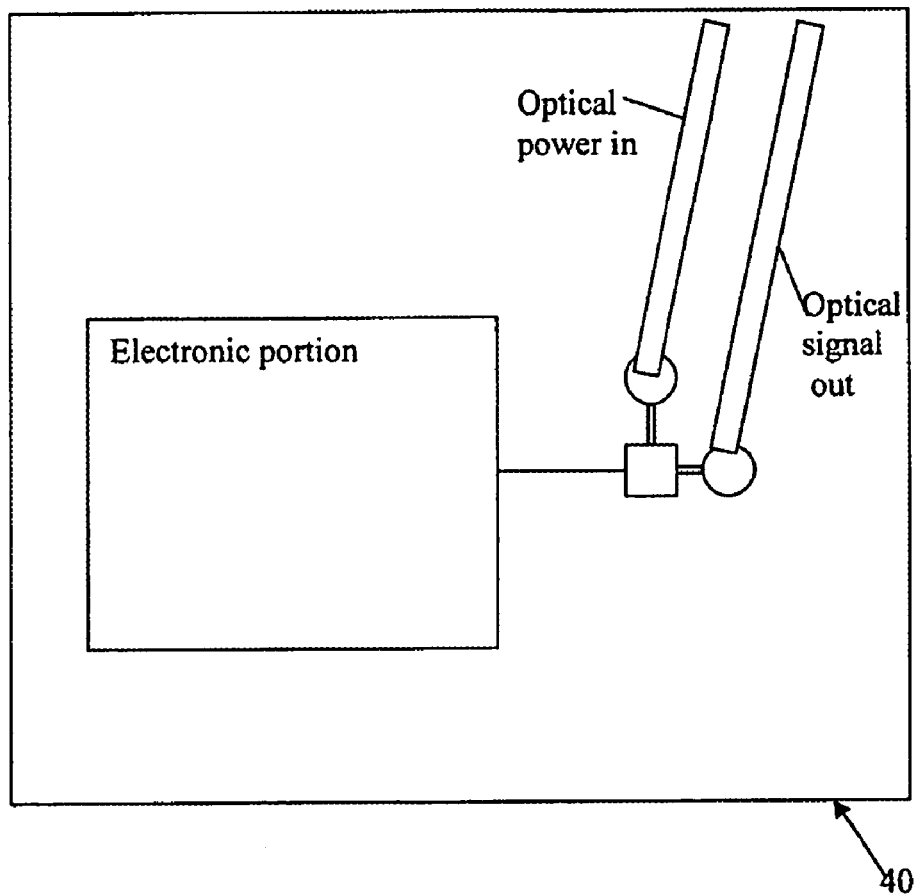
FIGS. 2a, 2b and 2c illustrate examples of integrated photonic-electronic circuits capable of transmitting, but not receiving optical signals.
Figure 2B:
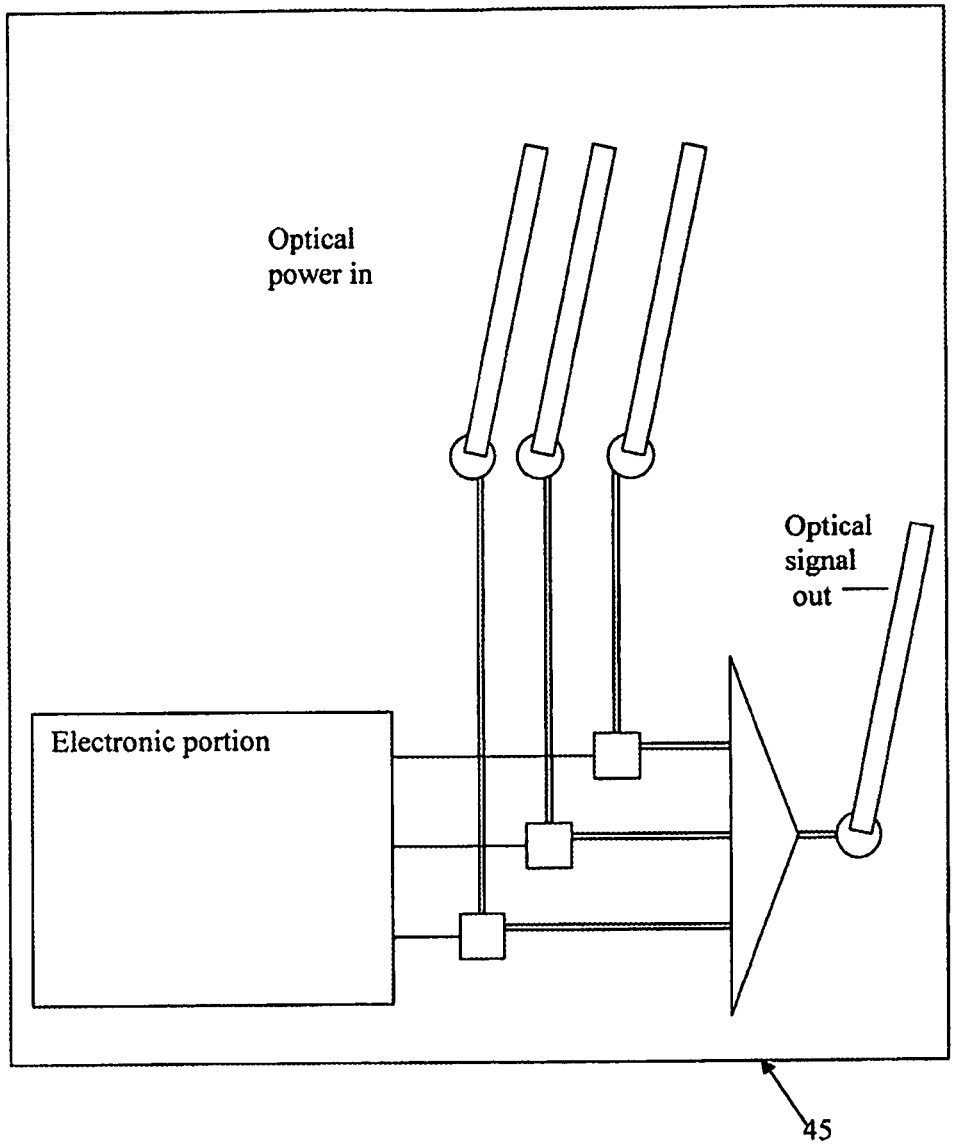
Figure 2C:
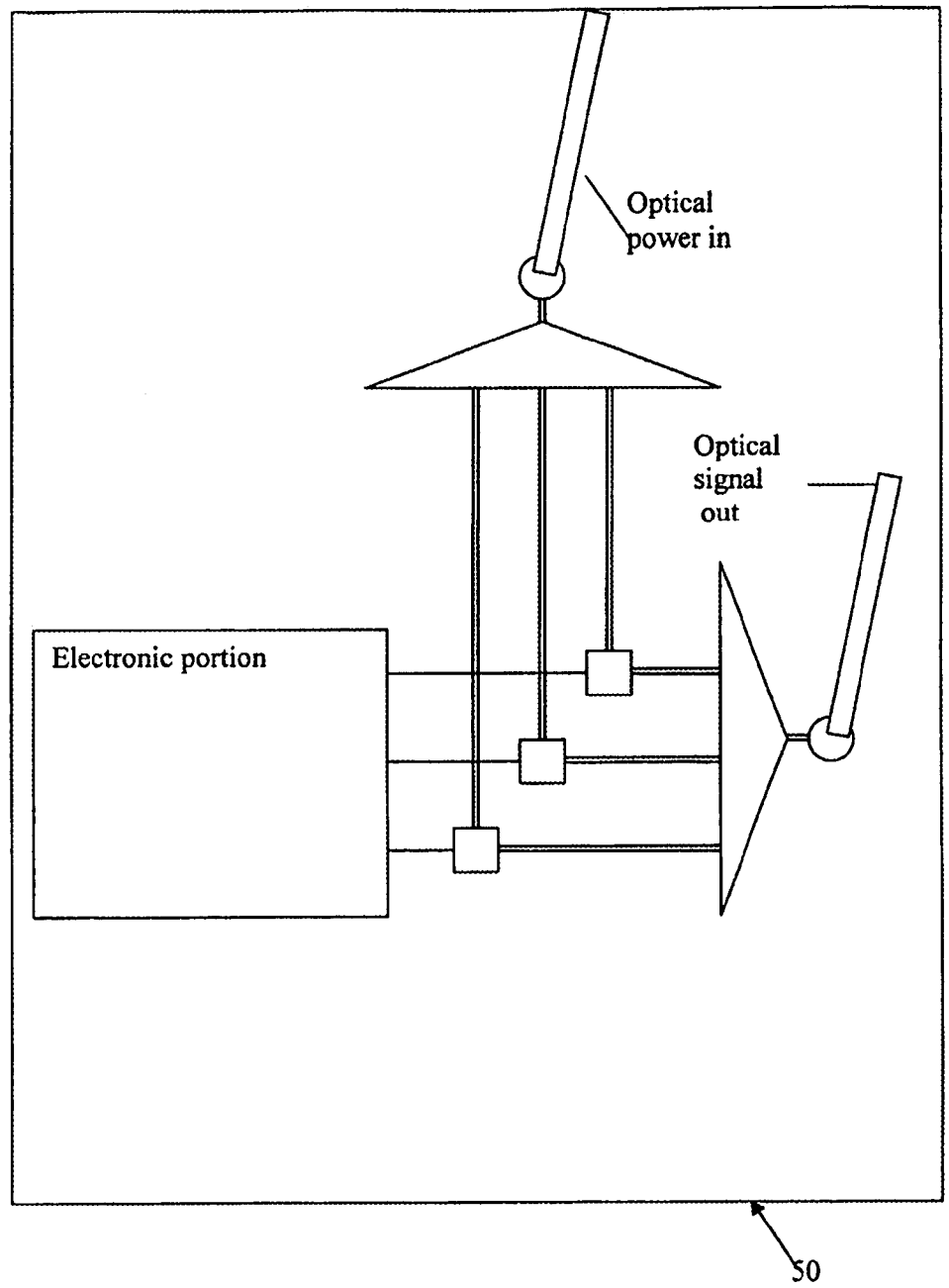
Figure 2D:
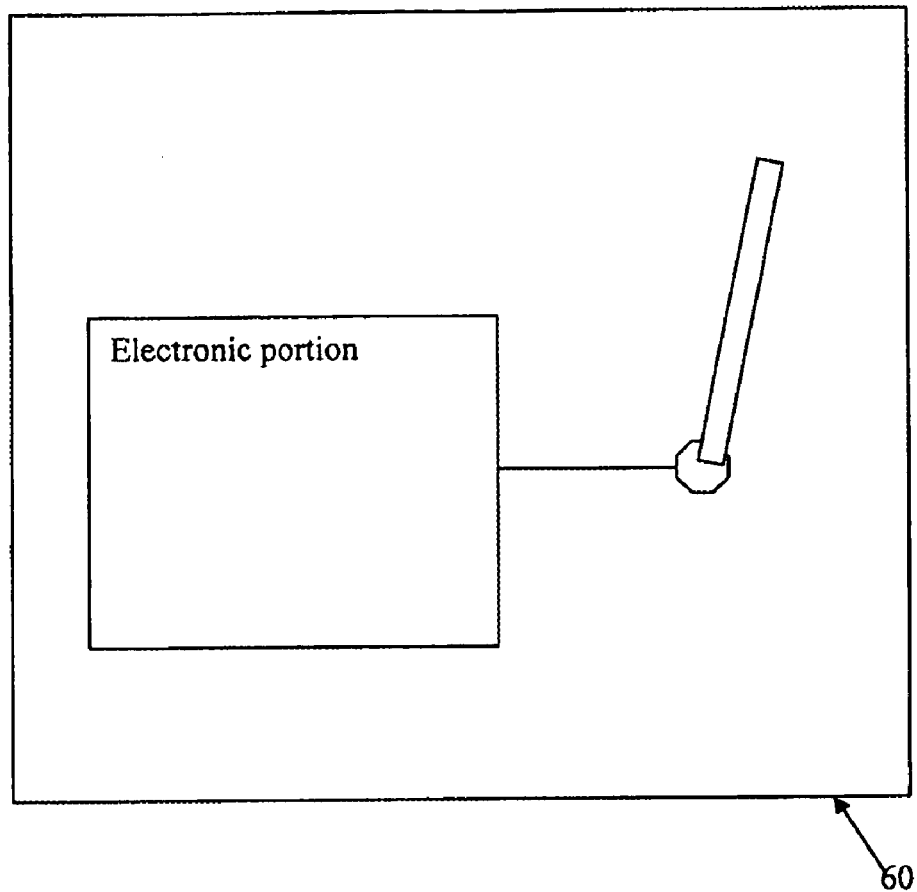
FIGS. 2d and 2e illustrate examples of integrated photonic-electronic circuits capable of receiving, but not transmitting optical signals.
Figure 2E:
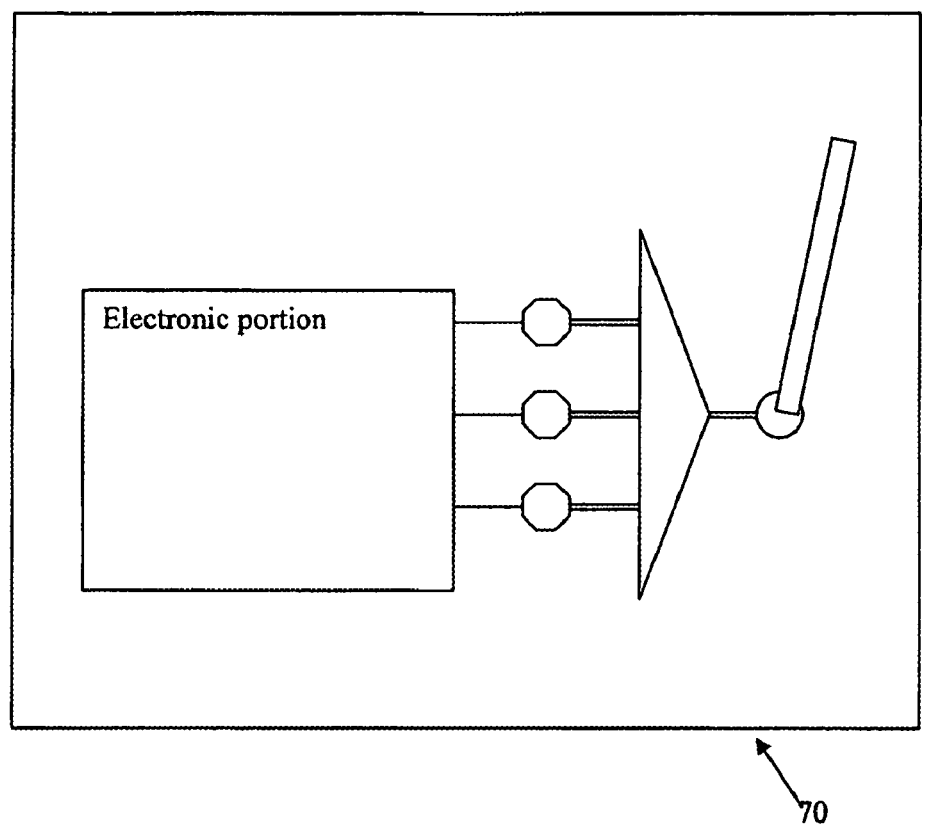
Figure 2F:
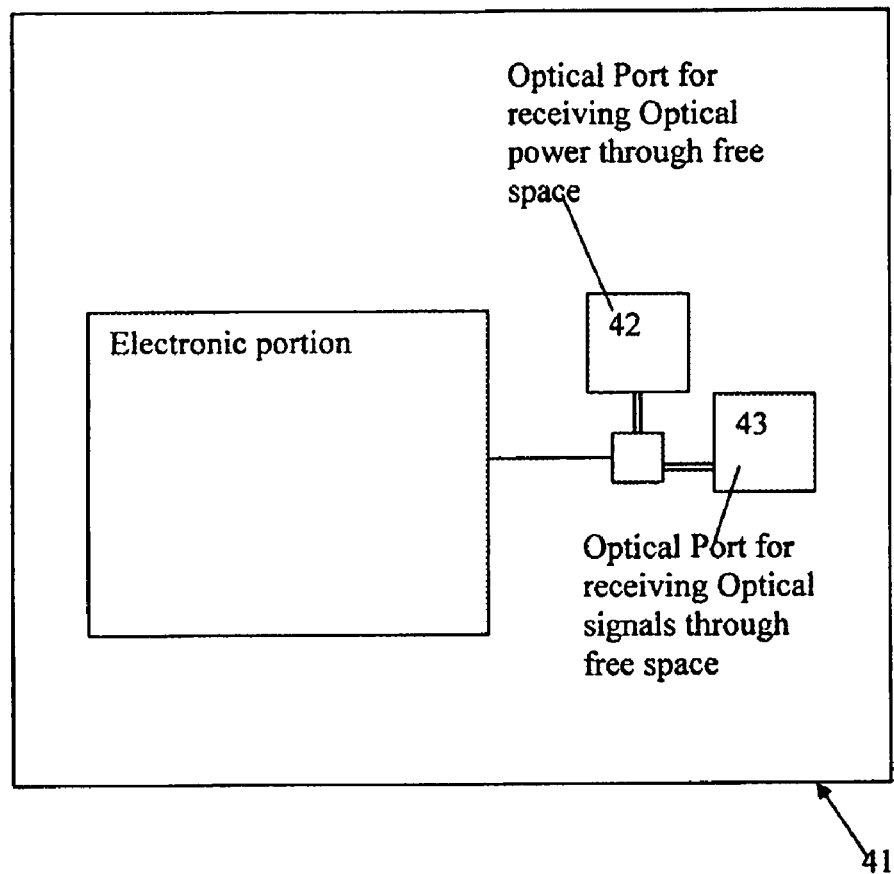
FIGS. 2f, 2g and 2h illustrate examples of integrated photonic-electronic circuits capable of transmitting, but not receiving optical signals.
Figure 2G:
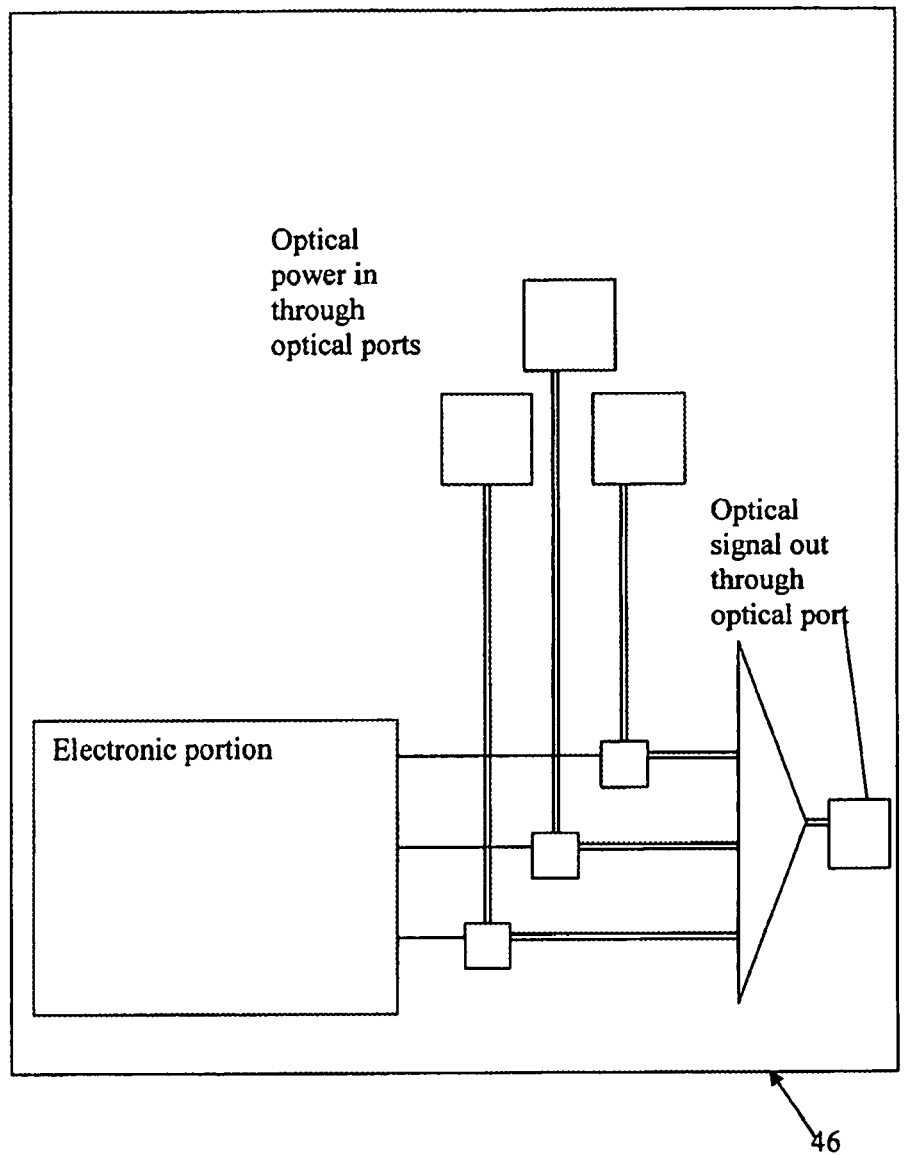
Figure 2H:
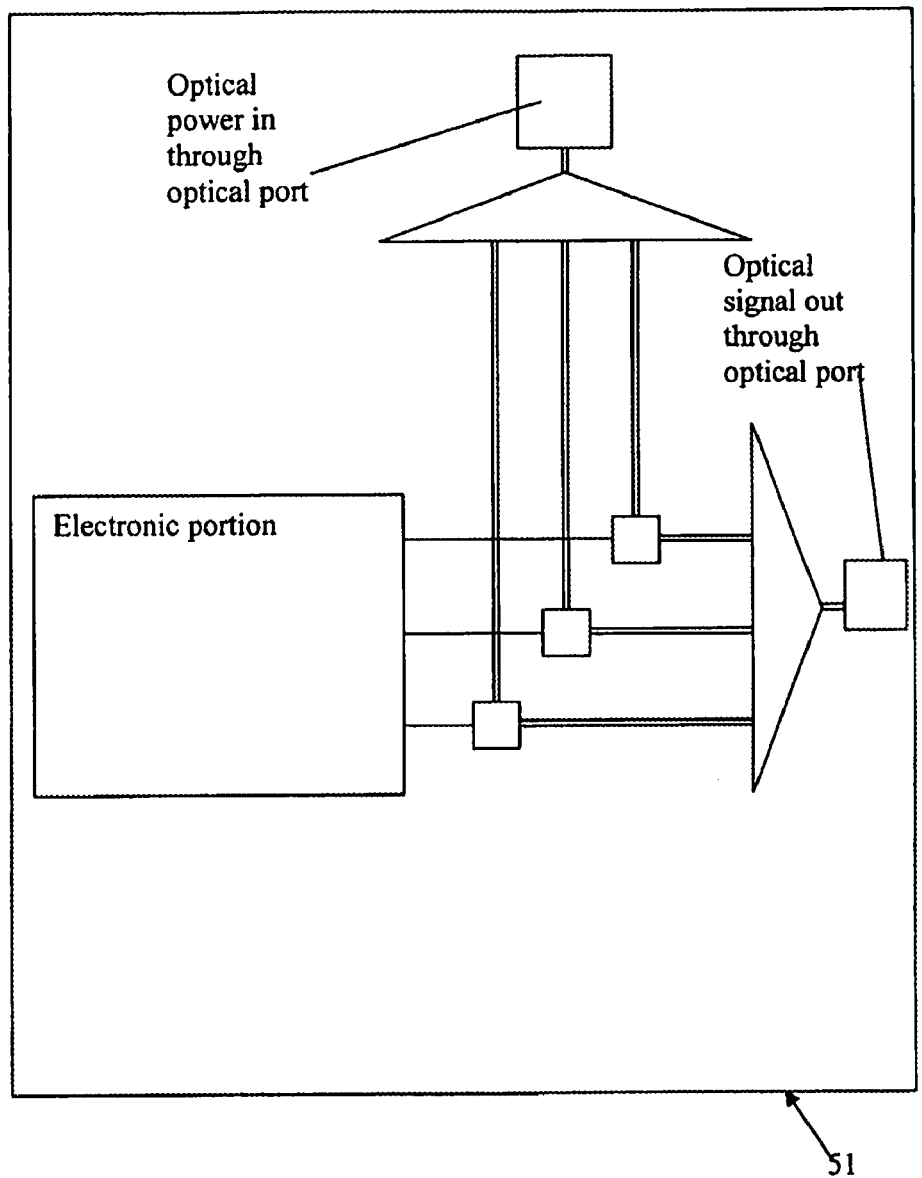
Figure 2I:
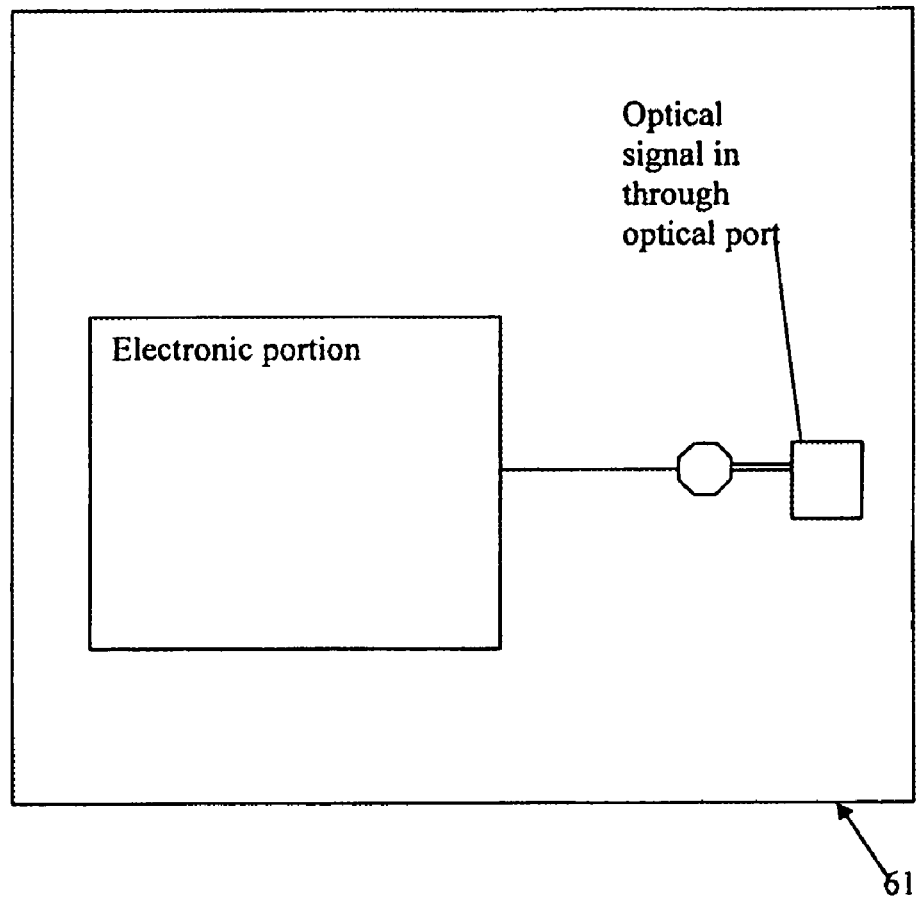
FIGS. 2i and 2j illustrate examples of integrated photonic-electronic circuits capable of receiving, but not transmitting optical signals.
Figure 2J:
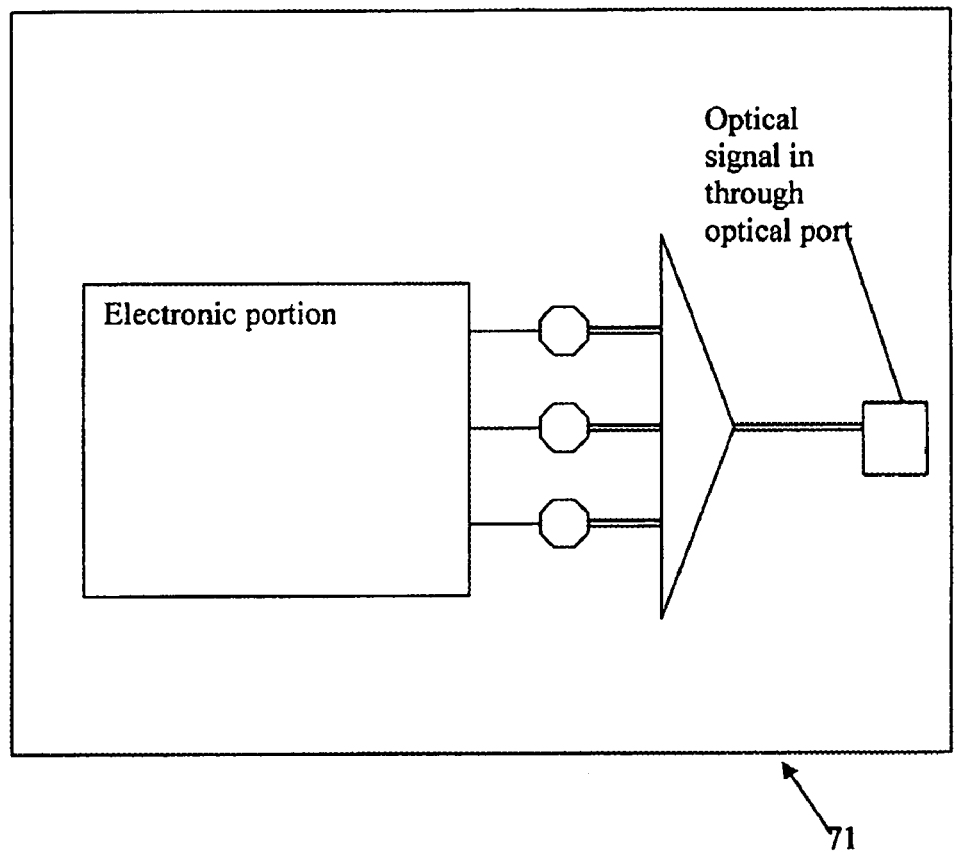

In the example illustrated in FIG. 1, the photonic portion comprises a receiver cell 4 and a transmitter cell 16 for coupling the electronic circuit portion 2 through optical ports to external optical fibers 10, 12, and 14. However, other examples of the current invention may comprise a larger or smaller number of components; for example, FIGS. 2a, 2b and 2c illustrate examples of integrated photonic-electronic circuits capable of transmitting, but not receiving optical signals. Integrated photonic-electronic circuit 40 includes a single transmitter cell containing a single optical transmitter; integrated photonic-electronic circuits 45 and 50 include a single transmitter cell containing three optical transmitters. Note that photonic-electronic circuit 45 supports multi-wavelength operation using multiple optical fibers for carrying optical power; in this case, each optical fiber carries a different wavelength optical power source, and no demultiplexer is required. Photonic-electronic circuit 50 supports multi-wavelength operation using a single incoming optical fiber for carrying optical power; in this case, a filter, such as but not limited to an optical demultiplexer, is required to separate out the wavelengths, but fewer fiber-to-chip connections are required. Furthermore, FIGS. 2d and 2e illustrate examples of integrated photonic-electronic circuits capable of receiving, but not transmitting, optical signals. Integrated photonic-electronic circuit 60 includes a single receiver cell containing a single optical receiver; integrated photonic-electronic circuit 70 includes a single receiver cell containing three optical receivers. In some cases, integrated photonic-electronic circuits may comprise optical ports instead of or in addition to optical fiber couplings; some examples of the current invention may be able to transmit and/or receive optical signals and/or receive optical power without coupling to an optical fiber. For example, optical power transmitted through free space may be received by the integrated photonic-electronic circuit through an optical port disposed on a surface of the integrated photonic-electronic circuit; similarly, optical signals transmitted through free space may be received by the integrated photonic-electronic circuit through an optical port and/or optical signals may be transmitted from the integrated photonic-electronic circuit through than optical port for transmission through free-space. In some cases, one or more optical ports may be disposed on a top surface, bottom surface and/or edge of an integrated photonic-electronic circuit. For example, FIGS. 2f, 2g and 2e illustrate examples of integrated photonic-electronic circuits capable of transmitting optical signals off-chip through optical ports, but not receiving optical signals. Integrated photonic-electronic circuit 41 includes a single transmitter cell containing a single optical transmitter; integrated photonic-electronic circuits 46 and 51 include a single transmitter cell containing three optical transmitters. Note that photonic-electronic circuit 46 supports multi-wavelength operation using multiple optical ports for carrying optical power; in this case, each optical port may receive optical power from a different wavelength optical power source, and no demultiplexer is required. Photonic-electronic circuit 51 supports multi-wavelength operation using a single optical port for receiving incoming optical power; in this case, a filter, such as but not limited to an optical demultiplexer, is required to separate out the wavelengths, but fewer optical ports are required. Furthermore, FIGS. 2i and 2j illustrate examples of integrated photonic-electronic circuits capable of receiving, but not transmitting, optical signals. Integrated photonic-electronic circuit 61 includes a single receiver cell containing a single optical port for receiving optical signals; integrated photonic-electronic circuit 71 includes a single receiver cell containing three optical ports for receiving optical signals.

Figure 3:
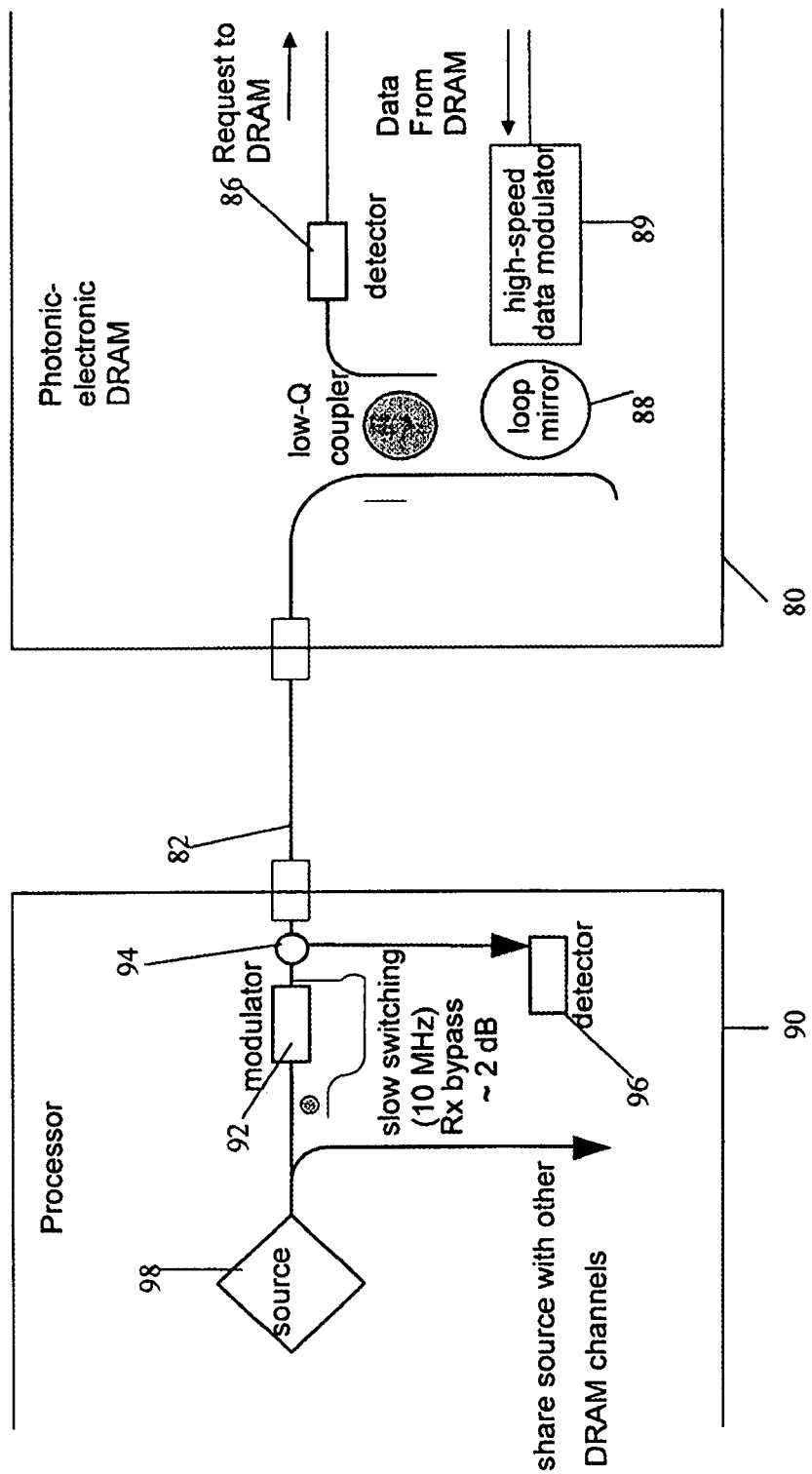
FIG. 3 illustrates an integrated photonic-electronic circuit capable of transmitting and receiving data in a half-duplex mode requiring only a single optical fiber connection for providing the pathway for incoming optical signals, outgoing optical signals and the incoming optical power source.

Some photonic-electronic circuits according to the current invention may be designed such that transmit and receive capabilities may be enabled with only a single external optical port connection. For example, FIG. 3 illustrates a photonic-electronic DRAM circuit 80 capable of transmitting and receiving data in a half-duplex mode requiring only a single optical port coupled to optical fiber 82 for providing the pathway for incoming optical signals, outgoing optical signals and the incoming optical power source. In this example, an incoming optical signal requesting the contents of a memory address may be transmitted by the processor's modulator 92 and received by the photonic-electronic circuit DRAM's detector 86. The processor's modulator 92 may then switch to a receive mode wherein it transmits an unmodulated optical signal generated by the source 98 to the photonic-electronic DRAM 80. In this example, a loop mirror 88 enables the photonic-electronic circuit 80 to use the incoming unmodulated optical signal to optically power the modulator 89 enabling it to transmit an optical signal containing the requested data back through the same optical fiber 82 to the processor 90. In this example, by using a non-reciprocal splitter 94, the processor's detector 96 can receive the optical signal from the photonic-electronic circuit DRAM 80 without direct exposure to the optical power source 98 thereby avoiding over-saturation of the detector 96.

Multiple integrated electronic-photonic circuits as well as other electronic and/or photonic elements may be collected together on a single chip to create larger, more complex devices. In another example according to the current invention, one or more optional electrical interconnects may be implemented on the electronic-photonic circuit chip for receiving and/or transmitting electronic signals. For example, a receive-only circuit, such as 60 or 70 could receive optical signals, translate them to electrical signals, provide optional processing and/or filtering of the incoming signal with the on-chip electronics and then transmit electrical signals off-chip through an electrical interconnect. Similarly, for example, a transmit-only circuit such as 40 or 50 could receive electrical signals, provide optional processing and/or filtering of the incoming signal with the on-chip electronics, translate electrical signals to optical signals, and then transmit optical signals off-chip to a fiber. Depending on the configuration, the optional electrical interconnect may support one-way and/or two-way traffic. Considering the integrated electronic-photonic circuit illustrated in FIG. 1, capable of transmitting and receiving optical signals, one or more additional electrical interconnects could provide additional capabilities such as enabling inter-networking between optical and electronic networks. For example, an integrated electronic-photonic circuit according to the current invention with the optional electrical interconnect may be used as a gateway between electronic and optical networks.

In the example illustrated in FIG. 1, optical fibers 10, 12, and 14 are external to the current invention. In this example, a receiver cell receives optical signals, translates some or all of the received optical signals into electrical signals and transmits some electrical signals to the electronic circuit portion; a transmitter cell receives electrical signals from the electronic circuit portion, receives an unmodulated multi-wavelength light source, translates some or all of the received electrical signals into optical signals and transmits some optical signals powered by the received unmodulated multi-wavelength light source. According to the current invention, the received and/or transmitted optical signals may be digital signals, analog signals or a mix of digital and analog signals.

In the example illustrated in FIG. 1, example receiver cell 4 includes broad-band coupler (BBC) 6, demultiplexer 7 and detector array 9 as well as Si—SiO$_x$ waveguides to pipe light within the chip. In this example, an optical signal may be received by the photonic-electronic circuit from external optical fiber 12 through BBC 6; the optical signal may be transmitted via Si—SiO$_x$ waveguide from BBC 6 to Arrayed WaveGuide (AWG) demultiplexer 7 where the optical signal may be partially or completely demultiplexed; optical signals may be transmitted via an array of Si—SiO$_x$ waveguides from the demultiplexer to detector array 9; the detectors in detector array 9 may translate the optical signals into electrical signals, which may then be transmitted to electronic portion 2. Although this example involves the use of multiple wavelengths, other examples according to the current invention may operate based on one, two or more wavelengths of light. In this example, optical fibers 10, 12 and 14 are coupled through BBCs 3, 6 and 15 on the top surface of the photonic-electronic circuit. In this example, coupling the optical fibers through the surface of the photonic-electronic circuit may enable wafer-scale testing or sorting through proximity optical probes before dicing. Alternately, one or more optical ports disposed on a surface of the photonic-electronic circuit capable of receiving and/or transmitting optical signals and/or receiving optical power through free space may be used to support proximity optical probes. Although top surface mounting broadband couplers are illustrated in FIG. 1, other examples according to the current invention may use a variety of alternate geometries and/or components for coupling optical signals and/or power sources to the integrated photonic-electronic circuit. For example, in some cases, a V-groove fiber array may be used to clamp fibers to a top or bottom surface and/or one or more optical fibers may be coupled to integrated photonic-electronic circuits using edge couplers and/or backside couplers. In some cases, more than one type of optical coupling technology may be implemented on the same chip. In the example illustrated in FIG. 1, BBCs 3, 6 and 15 are grating couplers. In this example, some of the features of the grating couplers have sub-wavelength dimensions, so they may be used with a broader range of wavelengths than some similar grating couplers with larger feature dimensions. However, depending on the application and/or manufacturing techniques, a typical grating coupler with large feature dimensions may be used according to the current invention. According to the current invention, on-chip grating couplers capable of coupling multiple wavelengths at substantially the same acceptance angle for multiple channels combined with on-chip modulators, multiplexers and optical filters such as demultiplexers enable some high-density single chip Wavelength Division Multiplexing (WDM) solutions. Packaged solutions requiring external modulators such as Lithium Niobate (LiNbO3) modulators may be large and expensive. However, with single chip WDM solutions according to the current invention, compact, high bandwidth per fiber area solutions may be achieved. In the example illustrated in FIG. 1, fibers are coupled to the integrated photonic-electronic circuit using a "butt-coupling" technique; however, other examples according to the current invention may use different coupling techniques such as, but not limited to, Total Internal Reflection (TIR) coupling techniques. In the example illustrated in FIG. 1, the multiplexers and demultiplexers are AWG multiplexers and AWG demultiplexers; other examples according to the current invention may use different types of optical filters such as multplexers and/or demultiplexers for adding and/or dropping wavelengths and/or filtering such as, but not limited to, ring resonators.

In the example illustrated in FIG. 1, transmitter cell 16 includes a BBC 3 for coupling to an external optical power source, BBC 15 for coupling to an external optical fiber, a modulator array 8, demultiplexer 13, multiplexer 11 and Si—SiO$_x$ optical waveguides to pipe light within the chip. In this example, electrical signals from the electronic circuit portion 2 may be received by modulator array 8; the transmitter cell is optically powered by an unmodulated, multiwavelength external optical power source received through BBC 3 and transmitted via Si—SiO$_x$ optical waveguides to AWG demultiplexer 13 where the incoming light may be partially or completely demultiplexed into separate wavelengths; light is transmitted from demultiplexer 13 via an array of Si—SiO$_x$ optical waveguides to the modulator array 8; at the modulator array 8, electrical signals are received from the electronic portion and may be translated into optical signals that may be subsequently transmitted via an array of Si—SiO$_x$ optical waveguides to AWG multiplexer 11; some or all of the optical signals may be multiplexed into an optical signal and transmitted via Si—SiO$_x$ optical waveguide to an external optical fiber 14 through BBC 15.

In the example illustrated in FIG. 1, in-plane optical pathways are provided on-chip. For example, on-chip photonic waveguide elements guide optical signals from BBC 6 to demultiplexer 7, from demultiplexer 7 to detectors in detector array 9, from BBC 3 to demultiplexer 13, from demultiplexer 13 to modulators in modulator array 8, from modulators in modulator array 8 to multiplexer 11 and from multiplexer 11 to BBC 15. The Si—SiO$_x$ processes used to create the optical pathways illustrated in FIG. 1 are compatible with standard silicon semiconductor processing techniques. Some or all of the Si—SiO$_x$ optical pathways may be constructed as part of the integrated photonic-electronic circuit's front-end silicon semiconductor chip processing. The Si—SiO$_x$ waveguide may provide optical pathways for communication between functional areas on-chip and/or for transmitting clock signals to various functions on-chip. Because there is virtually no capacitance associated with transmitting signals through optical waveguides, some on-chip interconnections can be formed closer together than traditional high-speed metal wiring, resulting in a dense chip structure. In some cases, some or all of the Si—SiO$_x$ optical pathways may be formed after the standard front-end silicon semiconductor processing steps are completed. The high contrast in the index of refraction between the waveguide core and the waveguide cladding for the Si—SiO$_x$ optical pathways may support better optical confinement and tighter bend radii than lower contrast waveguides. Possible benefits to manufacturing the optical and electronic elements on-chip as part of a front end semiconductor fabrication process may include: a shorter production time, the ability to leverage expensive semiconductor manufacturing equipment and resources, and a reduced risk of contamination and/or damage to the non-photonic elements. The ability to leverage investments made in Si processing provides a profound advantage for electronic-photonic circuits according to the current invention over other photonic circuits made using other materials systems; in part, this is due to the ability to leverage the enormous annual global investment made in Si processing research and development which exceeds that made in the processing of other semiconductor materials systems by at least an order of magnitude. For examples of the current invention comprising CMOS logic and photonic elements, a wafer foundry may fabricate the CMOS logic and photonic elements concurrently on the same substrate, with one set of masks and one set of process steps; the electronic and photonic portions may reside side-by-side on each die, and mask patterns may differentiate which areas become CMOS logic or photonic elements. Optionally, examples of the current invention that are manufactured on Si substrates may be produced on large, high quality wafers in contrast to the dimensions and quality of some substrates used for manufacturing some optical elements such as Indium Phosphide (InP). Furthermore, large wafers support the usage of large die sizes; for example, using Si semiconductor fabrication processes, integrated photonic-electronic circuits may be manufactured on twelve-inch Si wafers with a die size in excess of two square centimeters ($cm^2$). In the example illustrated in FIG. 1, detectors in the detector array may be silicon-germanium detectors. In some cases, the silicon-germanium detectors may be manufactured during the front-end silicon semiconductor processing. However, in other examples according to the current invention, silicon-germanium detectors and/or detectors comprised of other materials systems may be manufactured after the front-end silicon semiconductor processing and incorporated into the photonic-electronic circuit chip in later stage processing. In some cases, the integrated photonic-electronic circuits may be manufactured on Si substrates, silicon on quartz substrates, silicon on sapphire (SOS) substrates or silicon on insulator (SOI) substrates.

Figure 4:
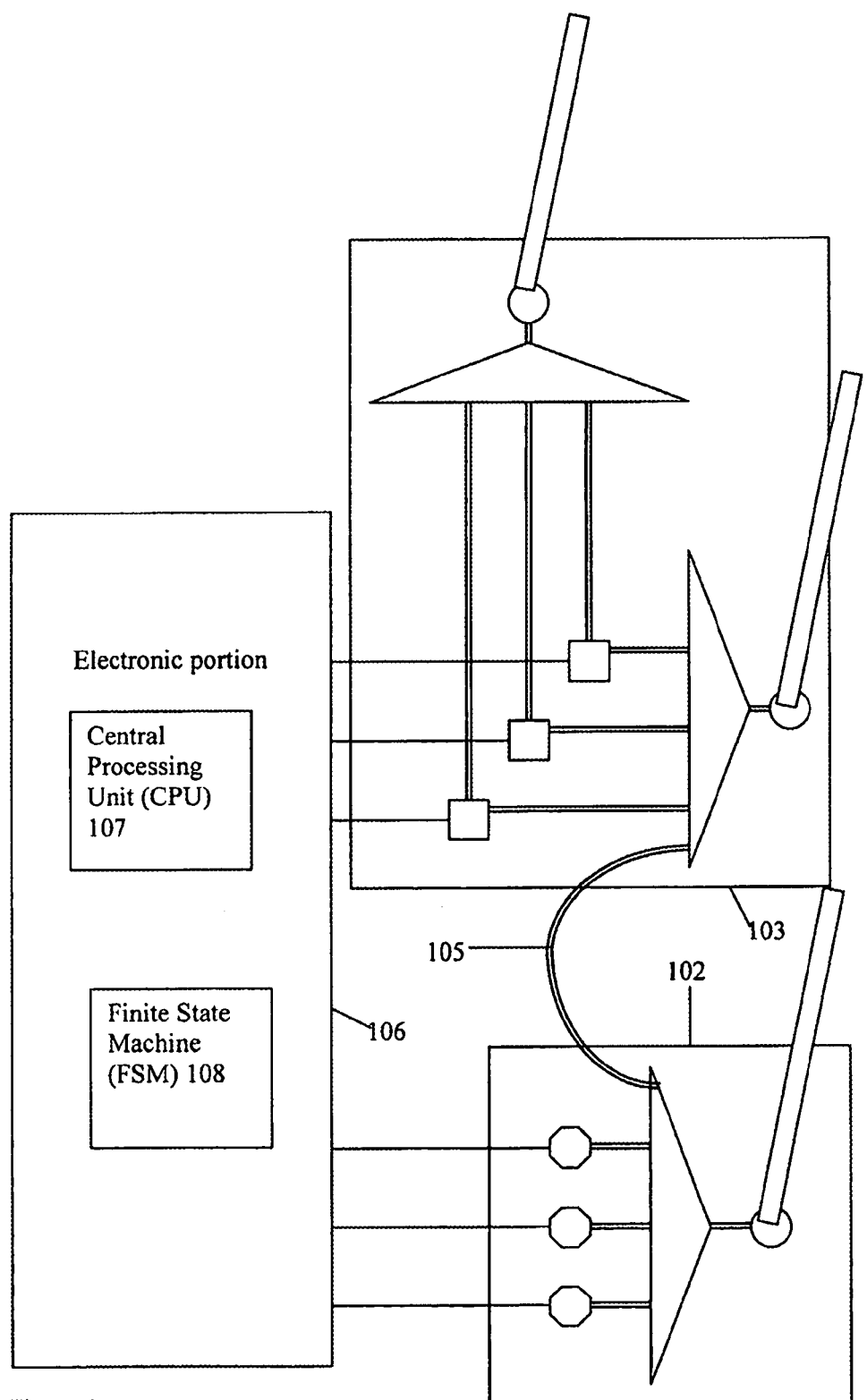
FIG. 4 illustrates an example according to the current invention of an optical bypass deployed in an integrated photonic-electronic circuit.

In some examples according to the current invention, an integrated photonic-electronic circuit may include an optical bypass. FIG. 4 illustrates an example according to the current invention of an optical bypass 105 deployed in an integrated photonic-electronic circuit. For example, in some cases, received optical signals may be routed from a receiver to a transmitter without introducing delays associated with translating the incoming optical signal to an electrical signal and then translating the electrical signal back to an optical signal for submission to a transmitter. In some cases, signals may be selectively bypassed based on one or more criteria such as, but not limited to, wavelength and/or time of day.

The example illustrated in FIG. 1 uses an external unmodulated multiwavelength light source to provide the optical power for transmitting optical signals. The telecommunications industry relies on large, often expensive, multiwavelength optical power sources optimized for loss and dispersion related to transmitting an optical signal over miles of fiber. However, a variety of different external optical power sources may be used to support the current invention. This is especially relevant when the current invention is used in applications where a signal may be transmitted over short distances from a few millimeters to several kilometers. In some cases, inexpensive and even partially incoherent light sources such as, but not limited to, standard lightbulbs may be used as optical power sources; optical power sources should contain at least some portion of light with an energy less than the bandgap energy of the layer of group IV semiconductor material in the electronic circuit portion. However, in some cases, different coding schemes and/or error-correcting activities may be required to support low quality and/or partially incoherent light sources. Examples of other suitable optical power sources may include, but are not limited to, Fabry-Perot diode lasers, ring lasers, superluminescent diodes (SLEDs), semiconductor mode-locked lasers, and multiwavelength sources (MWS).

In some cases, integrated photonic-electronic circuits according to the current invention may be reconfigurable. In some cases, the integrated photonic-electronic circuits may be remotely reconfigurable and/or automatically self-reconfiguring. Depending on the design of the reconfigurable integrated photonic-electronic circuits, software, firmware and/or hardware may be reconfigurable. In some cases, the photonic elements and/or electronic elements may be reconfigurable. Redundant reconfigurable integrated photonic-electronic circuits may be used to provide high reliability systems; reconfigurable self-monitoring and/or self-correcting integrated photonic-electronic circuits may be used to address dynamic situations such as beam drift and/or temperature-related phenomena; reconfigurable integrated photonic-electronic circuits may be used to re-allocate resources to address power management issues. A reconfigurable integrated photonic-electronic circuit may be designed with a set of selectively deployable features, which may be field-enabled through software, firmware, and/or hardware reconfiguration. Using this technique, a wide variety of products may be produced from the same mask set, minimizing manufacturing expense and risk.

Figure 5:
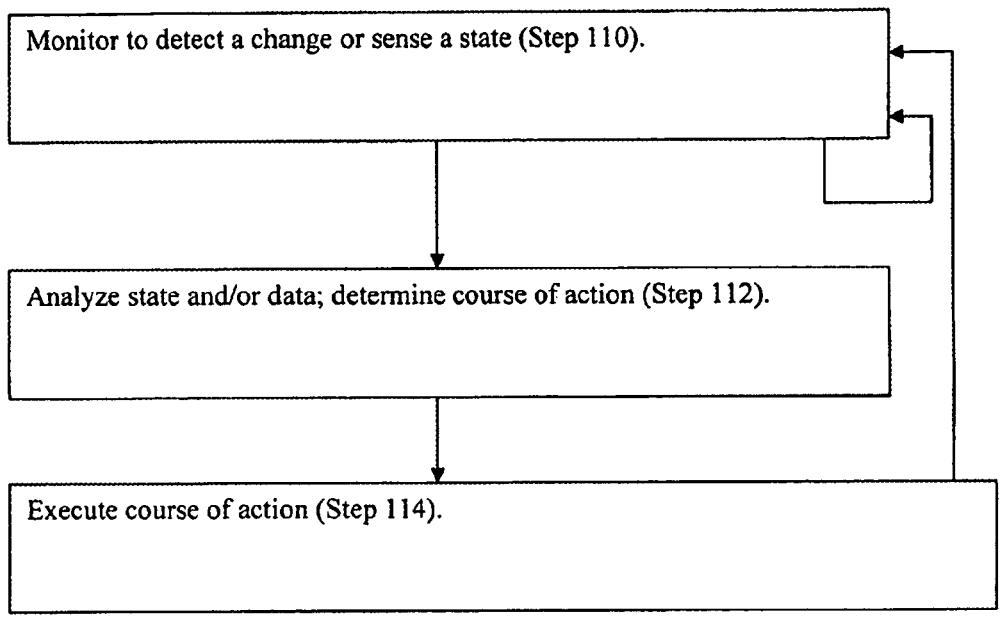
FIG. 5 illustrates a flow chart illustrating the operation of an example of an introspective reconfigurable photonic-electronic circuit.

The integration of electronic and photonic elements on the same chip enables rapid interaction between the electronic and photonic elements. For example, the on-chip electronic portion may perform a variety of activities such as, but not limited to controlling and/or monitoring photonic elements, processing detected signals, data recovery, error correction and bus synchronization. In some cases, the control and/or monitoring activities may take place partially or wholly on-chip or partially or wholly off-chip and may be based on any condition or set of conditions which may be sensed and/or computed on-chip and/or off-chip. Control and/or monitoring systems could incorporate any combination of analog, digital and/or hybrid techniques including, but not limited to, positive feedback loops, negative feedback loops, and/or phase-locked loops. For example, it is envisioned that some analysis of the incoming optical signals and/or optical power sources may be executed on-chip. For example, the input to an optical detector may be analyzed to determine if the frequency of an incoming optical signal is drifting. In some cases, the results of analysis may be transmitted to an external resource such as, but not limited to, an alarm, control and/or management console. In some cases, various optical elements such as, but not limited to, the detectors and/or transmitters may be optimized, configured, re-configured and/or controlled in part or wholly by on-chip electronics. For example, on-chip and/or off-chip analysis of an optical signal and/or a detected jump in a network error rate may indicate that the optical signal is drifting; it is envisioned that in some examples according to the current invention, an on-chip system may center the frequency of an optical filter in front of an on-chip detector element. In some cases, the on-chip system may dynamically and/or automatically center the frequency of some optical filters; in other cases, the on-chip system may take an action such as, but not limited to, centering the frequency of an optical filter, in response to a command or signal received from an external entity, and/or based on a schedule. In some cases, dynamic and/or automatic reconfiguration may take place based on a threshold value, status and/or state change. For example, on-chip electronics may be used to monitor the chip temperature and reconfiguration of an optical filter may be initiated based on a threshold temperature. In some cases, logic to mediate a feedback loop between detectors and tunable filters may be used to help address frequency drift problems; in this example, analog optical signal processing benefits from on-chip digital logic control. In some cases, redundant optical elements such as AWGs may be deployed on-chip; the on-chip electronics may selectively shift usage of the AWGs based on their properties, stability and/or operational status. In some cases, a variety of optical elements with differing properties may be deployed on chip such as, but not limited to, an array of AWGs with varying offset frequencies; the on-chip electronics may selectively shift the usage of the AWGs in response to frequency drift. According to the current invention, introspective photonic-electronic circuits may be created. An introspective circuit may manage itself intelligently. FIG. 5 illustrates a flow chart illustrating the operation of an example of an introspective reconfigurable photonic-electronic circuit. Beginning with Step 110, the introspective reconfigurable photonic-electronic circuit detects a change or senses a state. For example, an introspective, reconfigurable photonic-electronic circuit may detect a change or sense a state, such as a temperature drift or a change in the optical power of an incoming optical signal. In some cases, step 110 may be executed based in part on data and/or processing provided by an external source. In step 112, the data and/or state is analyzed by the introspective, reconfigurable photonic-electronic circuit and a course of action is determined. For example, the introspective, reconfigurable photonic-electronic circuit may determine that a coding scheme with increased overhead should be used to address issues with poor link performance. In some cases, additional data collection may be executed on-chip and/or off-chip; in some cases, the analysis may be supplemented by external processing and/or data. In step 114, the change may be implemented by the introspective reconfigurable photonic-electronic circuit. The introspective reconfigurable photonic-electronic circuit continues to monitor its state in step 110.

Other examples of reconfigurable integrated photonic-electronic circuits according to the current invention include circuits containing reconfigurable and/or reprogrammable electronic components. For example, an integrated photonic-electronic circuit designed for networking applications may support new, updated and/or upgraded network protocols based on downloading software and/or firmware and/or through reconfiguring logic devices. For example, state machines representing a network protocol may be configured in reprogrammable logic devices. Support for a new network protocol may be established by reconfiguring on-chip reprogrammable logic devices with a new state machine representing the new network protocol. Similarly, reconfigurable integrated photonic-electronic circuits may also be used to create high reliability solutions. For example, redundant electronic and/or photonic elements may be designed into reconfigurable integrated photonic-electronic circuits, providing adaptive and/or adaptable systems.

Figure 6:
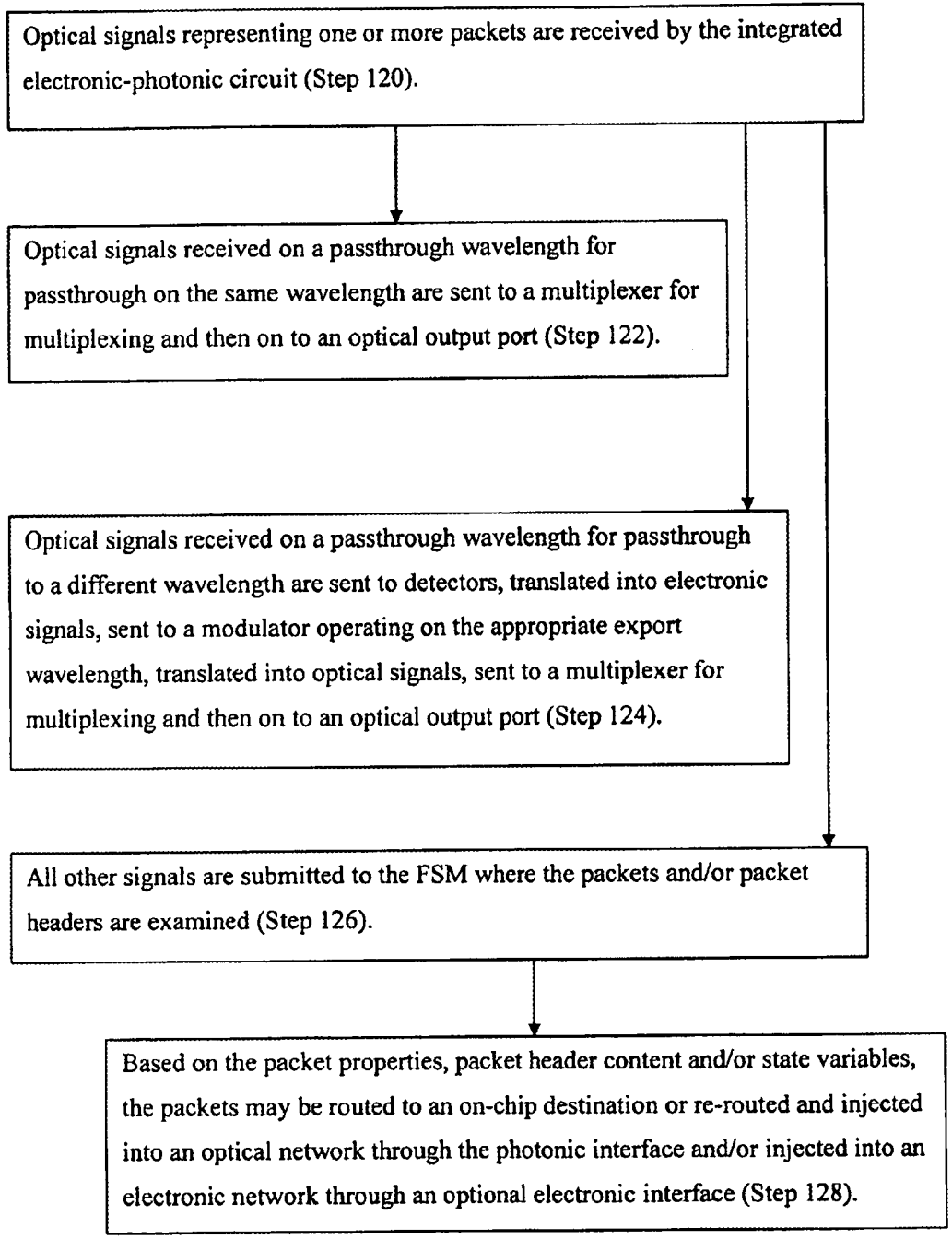
FIG. 6 is a flowchart illustrating the possible operation of a packet processing integrated electronic-photonic chip.

For example, the integrated photonic-electronic circuit illustrated in FIG. 4 may be used to provide sophisticated packet processing and/or routing. In this example, a Finite State Machine (FSM) 108 implemented in the electronic portion 106 may be used to examine packets and/or packet headers and then route packets on-chip and/or to electronic and/or optical interfaces for export off-chip. In some cases, a FSM such as FSM 108 may delete packets, alter the contents of packets and/or packet headers, and/or route packets for optical transport on a different wavelength. In some cases, a FSM may be used to construct and/or inject packets into an optical and/or electronic network. FIG. 6 is a flowchart illustrating the possible operation of a packet processing integrated electronic-photonic chip. In Step 120, optical signals representing one or more packets are received by the integrated electronic-photonic circuit. In Step 122, optical signals received on a passthrough wavelength for passthrough on the same wavelength are sent to a multiplexer for multiplexing and then on to an optical output port. In Step 124, optical signals received on a passthrough wavelength for passthrough to a different wavelength are sent to detectors, translated into electronic signals, sent to a modulator operating on the appropriate export wavelength, translated into optical signals, sent to a multiplexer for multiplexing and then on to an optical output port. In Step 126, all other signals not addressed in steps 122 and 124 are submitted to the FSM where the packets and/or packet headers are examined. In Step 128, based on the packet properties, packet header content, and/or state variables, the packets may be routed to an on-chip destination or re-routed and injected into an optical network through the photonic interface and/or injected into an electronic network through an optional electronic interface.

It is envisioned that some examples of integrated photonic-electronic circuits such as, but not limited to, the integrated photonic-electronic interconnect illustrated in FIG. 1 may be used as interconnects between chips, packages, modules and/or components within a system such as, but not limited to, computer systems, switches, concentrators, and processors for voice, data, and/or video streams; in some cases, some examples of integrated photonic-electronic circuits may be used as interconnects between computers, peripherals and/or network enabled elements in a data center and/or around a corporate campus where the optical signals may be transmitted over relatively short distance ranges such as a few millimeters to a few kilometers as well as applications where the optical signals may be transmitted over longer distances. In some cases, integrated photonic-electronic chips may communicate with each other directly by exchanging light signals from silicon chip to silicon chip, without need for intervening optical technology, other than connecting fiber. Furthermore, the external optical power sources may be configured to provide a high-reliability, high-availability system that does not require a complete system restart or power cycle in order to replace an optical power source. For example, one or more hot-swappable optical power sources may be maintained on stand-by. In some cases, the hot-swappable optical power sources may be maintained in a no- or low-power state, requiring the optical power source to power up partially or completely before becoming operative. In other cases, the hot-swappable power sources may be maintained in a powered up state, ready to provide optical power without requiring a delay while the optical power source warms up. Other high-availability optical power sources according to the current invention may use an array of multiple, redundant optical power sources such that the failure of a single optical power source may reduce the optical power available in the system, but not enough to halt the operation of the system.

Figure 7:
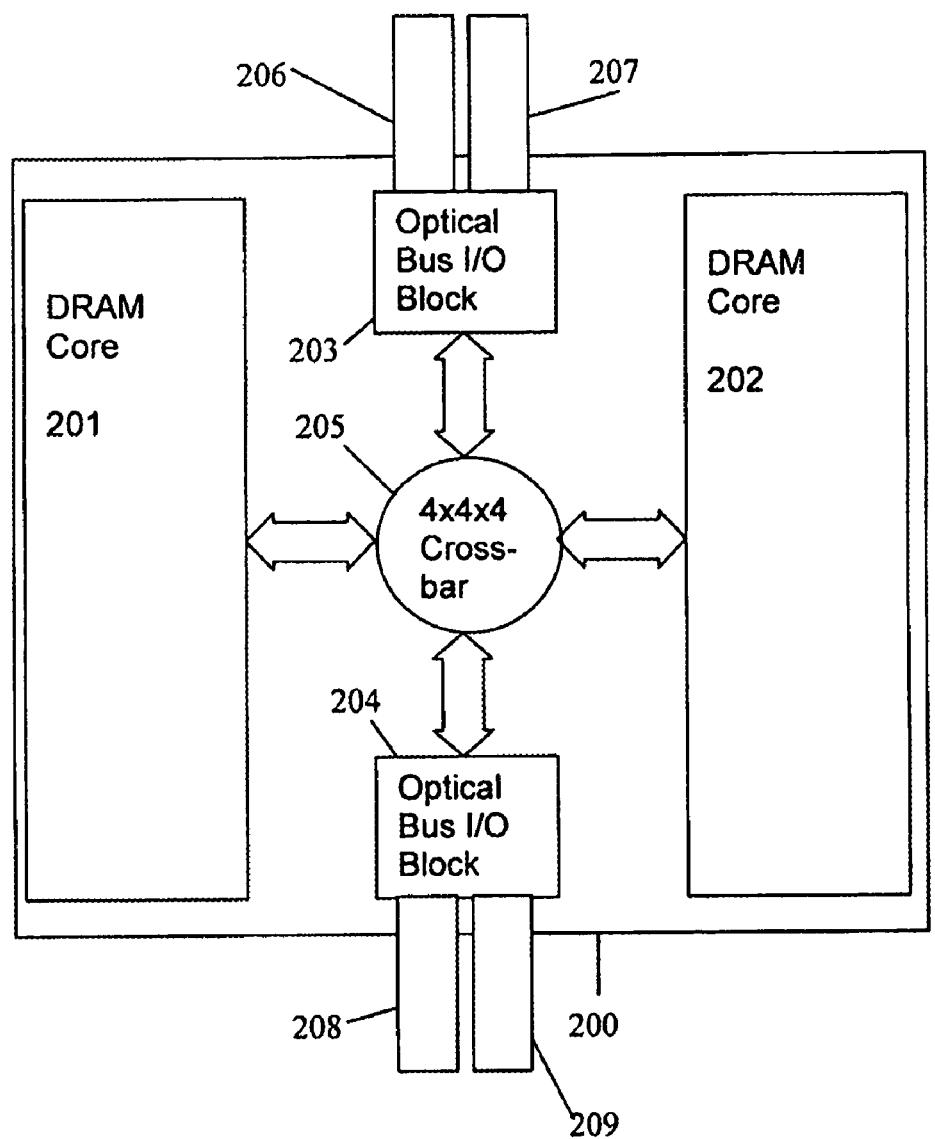
FIG. 7 illustrates an integrated photonic-electronic two-port DRAM chip.

FIG. 7 illustrates a reconfigurable integrated photonic-electronic two-port DRAM chip 200. In this example, after the current invention, multi-wavelength, unmodulated optical power is carried to chip 200 on a single fiber (not shown), split and used to power both Optical Bus I/O blocks 203 and 204; multi-wavelength optical signals are carried to and from chip 200 on fibers 207 and 209. Optical Bus I/O blocks 203 and 204 comprise transmitter and receiver cells similar to cells 4 and 16 and a logic portion similar to cell 2, as illustrated in FIG. 1. Electrical four-by-four (4×4) crossbar 205 interconnects Optical Bus I/O blocks 203 and 204 and DRAM cores 201 and 202, receiving and transmitting electrical signals. It is envisioned that integrated photonic-electronic DRAM chips such as chip 200 may operate in a word oriented mode. For example, two-port DRAM chip 200 may support a virtual 512 bit data bus for supporting 16 bit words based on both wavelength- and time-division multiplexing; 16 colors may support the transfer of a 16 bit word, with a sequence of 32 time slices used to transfer all 512 bits of data.

Figure 8:
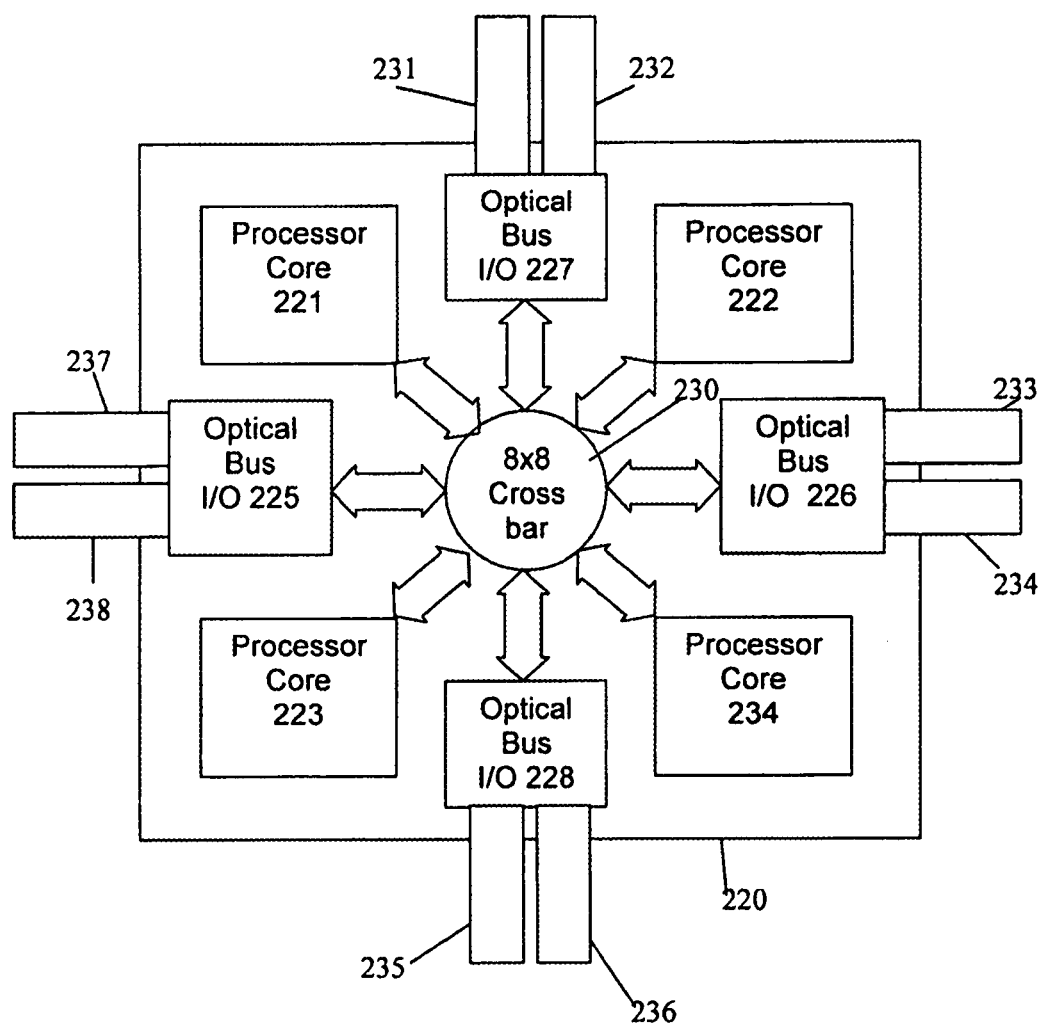
FIG. 8 illustrates an integrated photonic-electronic multi-processor chip.
Figure 9:
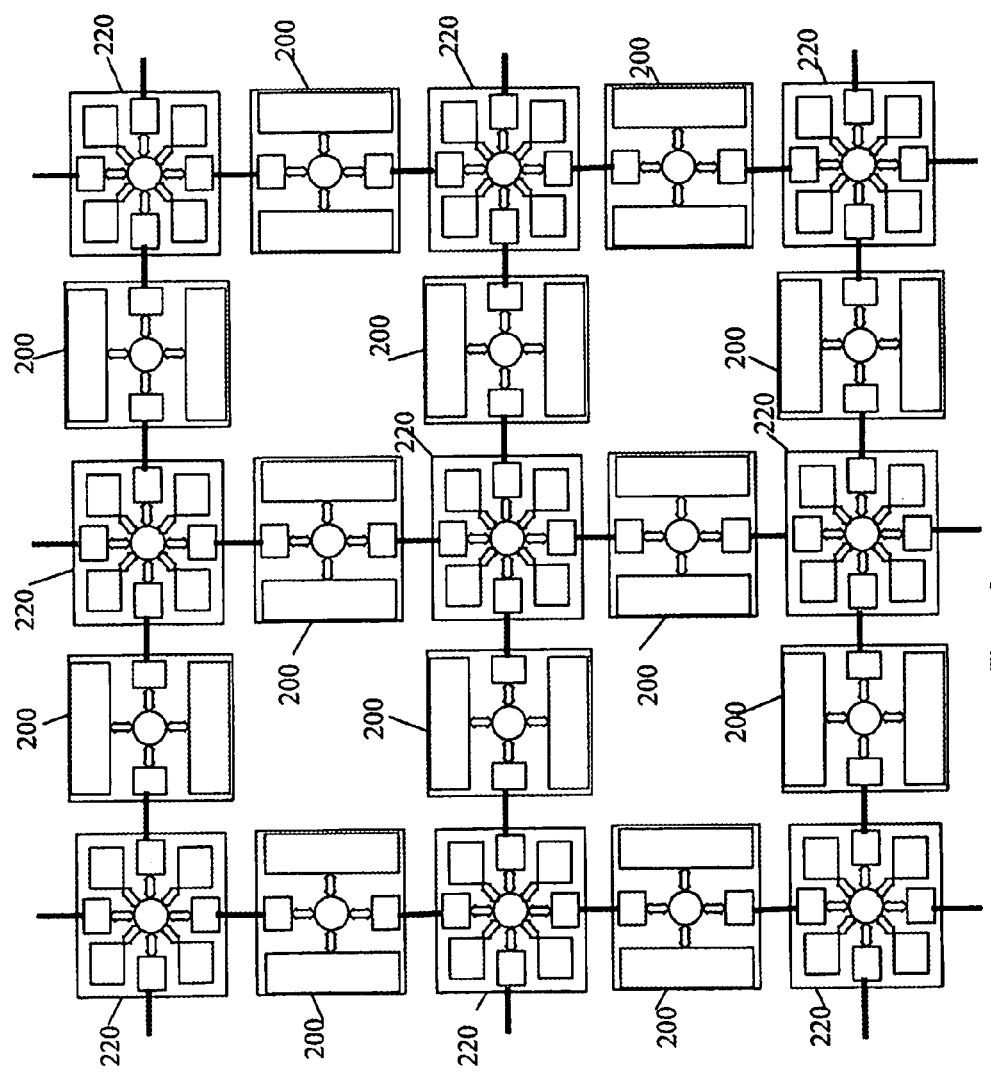
FIG. 9 illustrates an example of a multi-chip array of coupled integrated photonic-electronic circuit chips.
Figure 10:
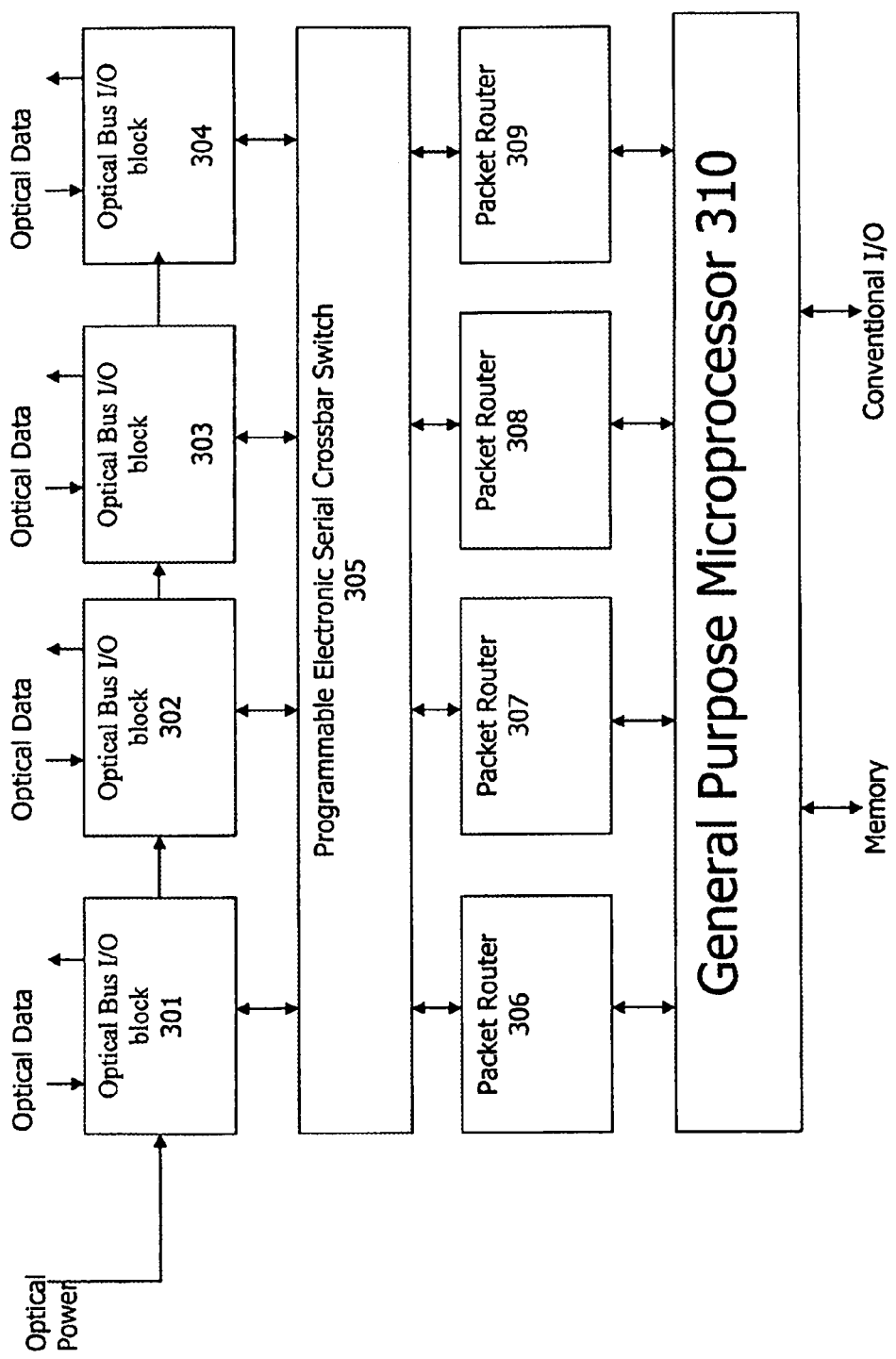
FIG. 10 illustrates an example of a reconfigurable integrated photonic-electronic circuit chip with packet routers.

FIG. 8 illustrates a reconfigurable integrated photonic-electronic multi-processor chip 220. In this example, after the current invention, multi-wavelength, unmodulated optical power is carried to chip 200 on a single fiber (not shown), split and used to power Optical Bus I/O blocks 225, 226, 227 and 228; multi-wavelength optical signals are carried to chip 220 on fibers 231, 233, 235 and 237; multi-wavelength optical signals are carried from chip 220 on fibers 232, 234, 236 and 238. Optical Bus I/O blocks 225, 226, 227 and 228 comprise transmitter and receiver cells similar to cells 4 and 16 and a logic portion similar to cell 2, as illustrated in FIG. 1. Electrical eight-by-eight (8×8) crossbar 230 interconnects Optical Bus I/O blocks 225, 226, 227 and 228 and processor cores 221, 222, 223 and 234, receiving and transmitting electrical signals. It is envisioned that reconfigurable integrated photonic-electronic multiprocessor chips such as chip 220 may operate in a word oriented mode; for example, one or more integrated photonic-electronic multiprocessor chips such as chip 220 may be interconnected or networked with one or more reconfigurable integrated photonic-electronic DRAM chips such as chip 200 in a variety of physical and/or logical configurations such as, but not limited to, trees, banyan networks, rings, and/or hyper-cube configurations. In some examples, a variety of configurations may be established by reconfiguring network protocols, routing and/or networking instructions on the reconfigurable integrated photonic-electronic chips; for example, new networking instructions could be configured on Optical Bus I/O blocks such as 225, 226, 227, 228, 203 and/or 204. FIG. 9 illustrates an example of a multi-chip array of interconnected reconfigurable integrated photonic-electronic circuit chips. In some examples according to the current invention, signals, words and/or packets may be routed through an array of reconfigurable chips. In this case, a single physical configuration of an array of reconfigurable integrated photonic-electronic circuit chips may be used to support a wide variety of logical network configurations. In some cases, this type of flexibility may be useful for implementing Quality of Service (QoS), load balancing and/or fault tolerant solutions. FIG. 10 illustrates an example of a reconfigurable integrated photonic-electronic circuit chip with packet routers. For example, the programmable electronic serial crossbar switch 305 may enable flexible, reconfigurable implementation of circuit switching at the wavelength level, enabling any incoming wavelength to be switched to any outgoing wavelength and/or any on-chip packet router.

Figure 11A:
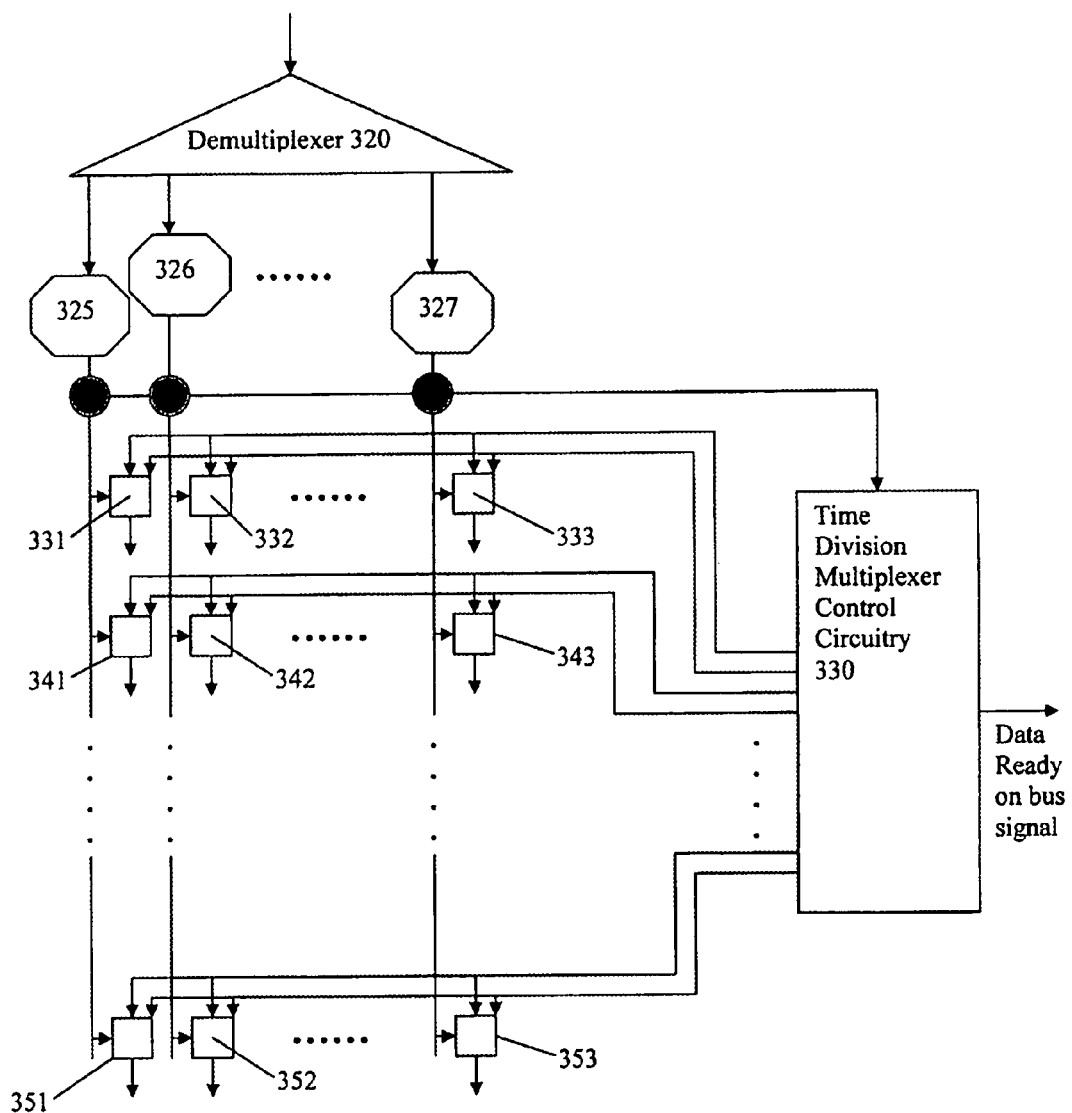
FIG. 11a illustrates a portion of a reconfigurable integrated photonic-electronic circuit chip with an interface that may support very data transfer rates onto the chip.
Figure 11B:
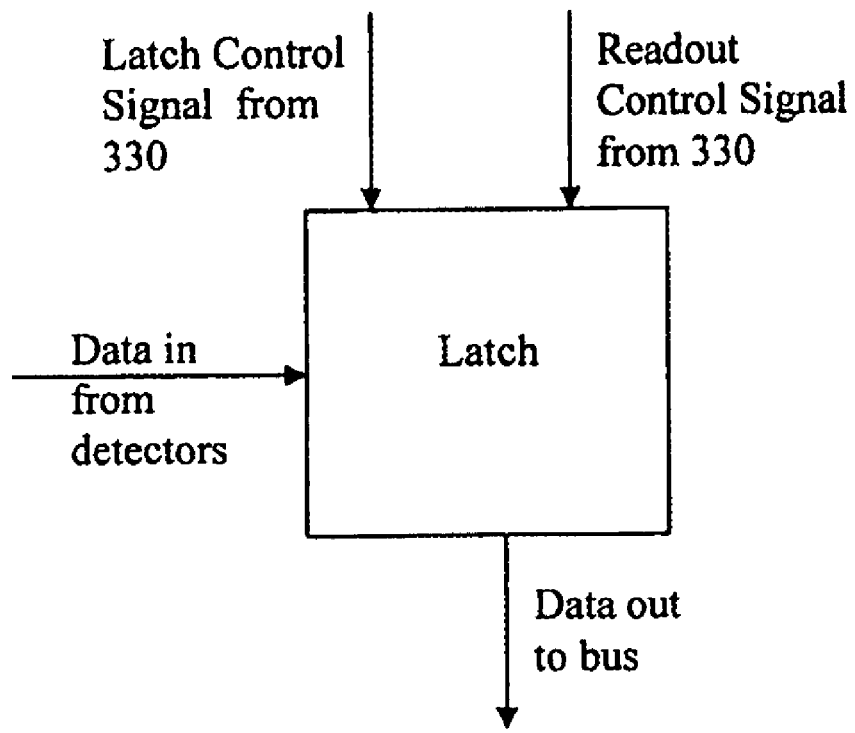
FIG. 11b illustrates an individual latch.

FIG. 11a illustrates a portion of a reconfigurable integrated photonic-electronic circuit chip with an interface that may support very high data transfer rates onto the chip. This type of chip may be configured to operate in a word-based mode. In this example, a multiwavelength optical signal is demultiplexed into N wavelengths at demultiplexer 320 and transmitted to N detectors 325, 326 . . . 327 via on-chip silicon containing optical waveguides. In this example, the electronic output of each detector is coupled to Time Division Multiplexer Control Circuitry 330; Time Division Multiplexer Control Circuitry 330 provides two inputs to each latch; Time Division Multiplexer Control Circuitry 330 detects the incoming data signals and provides read-out control and latch control to the array of latches. FIG. 11b illustrates an individual latch such as latch 331, 332, 333, 341, 342, 343, 351, 352, 353.

Figure 12A:
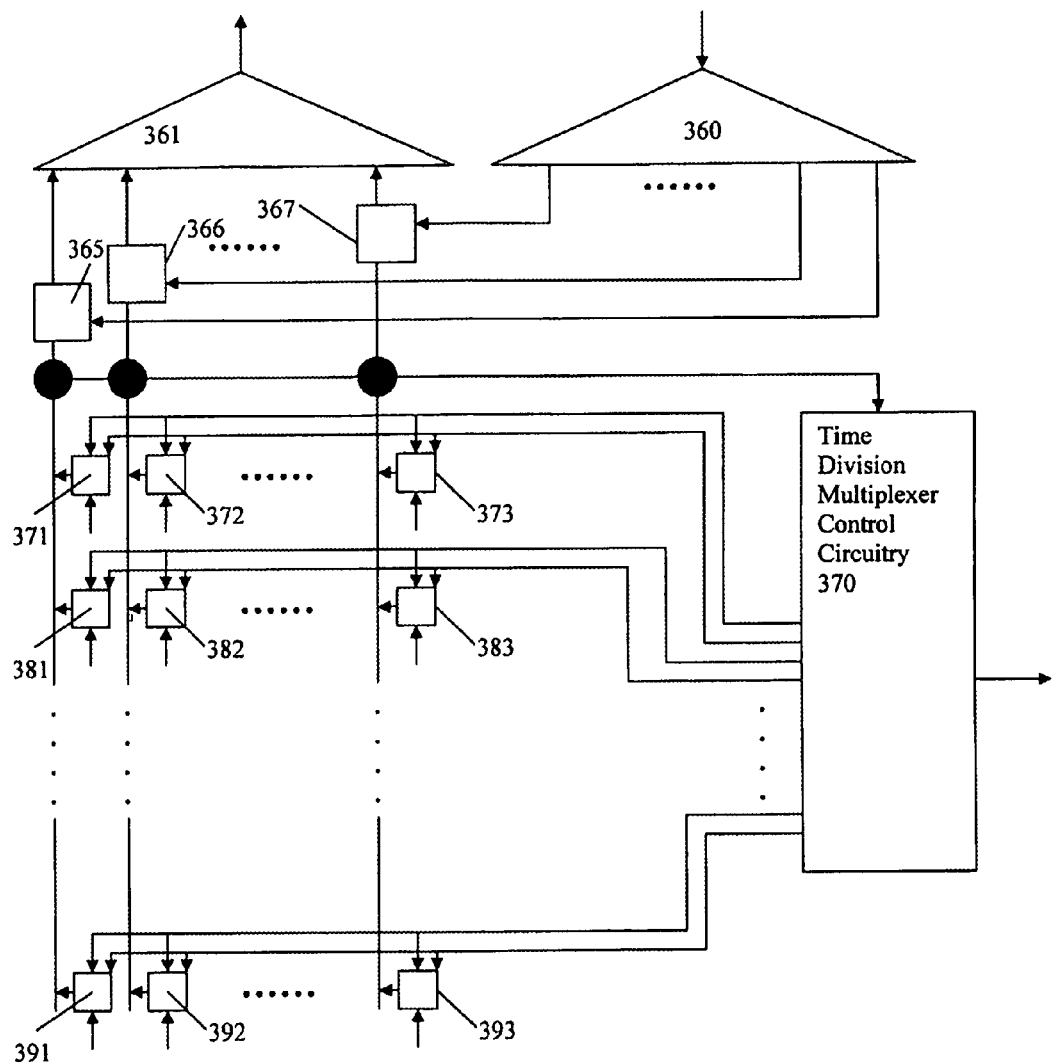
FIG. 12a illustrates a portion of a reconfigurable integrated photonic-electronic circuit chip with an interface that may support very data transfer rates off the chip.
Figure 12B:
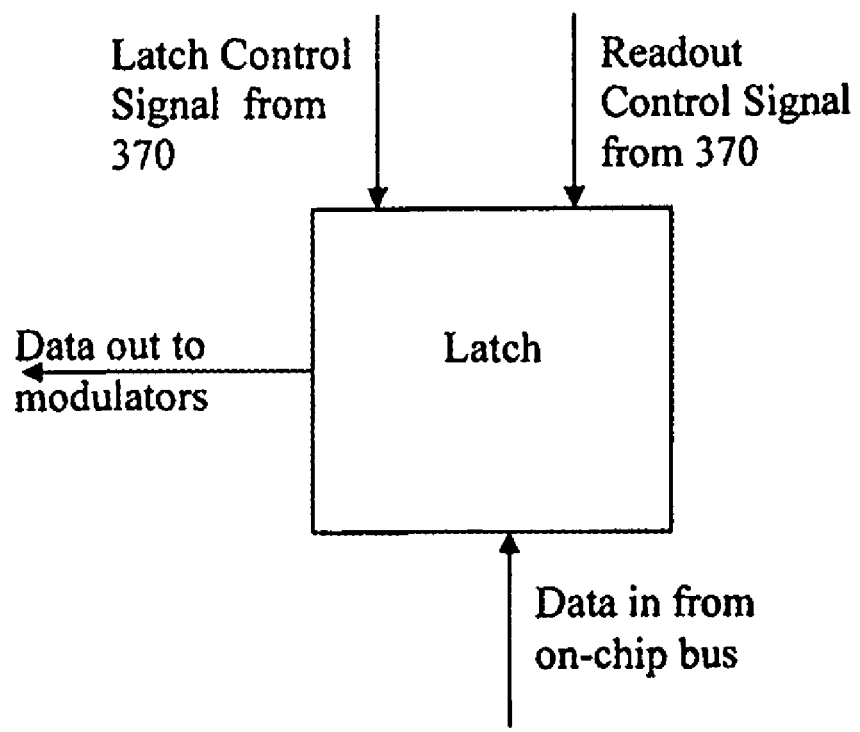
FIG. 12b illustrates an individual latch.

FIG. 12a illustrates a portion of a reconfigurable integrated photonic-electronic circuit chip with an interface that may support very high data transfer rates off of the chip. This type of chip may be configured to operate in a word-based mode. In this example, a multiwavelength optical power source is demultiplexed into N wavelengths at demultiplexer 360 and transmitted to N modulators 365, 366 . . . 367 via on-chip silicon containing optical waveguides. In this example, electrical signals are sent from the on-chip bus to the array of latches. The Time Division Multiplexer Control Circuitry 370 synchronizes the data flow from the latches to the modulators 365, 366 . . . 367; Time Division Multiplexer Control Circuitry 370 provides two inputs to each latch providing read-out control and latch control to the array of latches. FIG. 12b illustrates an individual latch such as latch 371, 372, 373, 381, 382, 383, 391, 392, 393. The output of modulators 365, 366 . . . 367 is multiplexed at multiplexer 361 for transfer off-chip on a multi-wavelength optical fiber. By implementing reconfigurable integrated photonic-electronic circuits with an interface as illustrated in FIG. 11a and an interface as illustrated in FIG. 12a on the same chip, very fast two-way optical interface may be established on a chip. Optionally, these two-way interfaces may be word-based interfaces.

Figure 13:
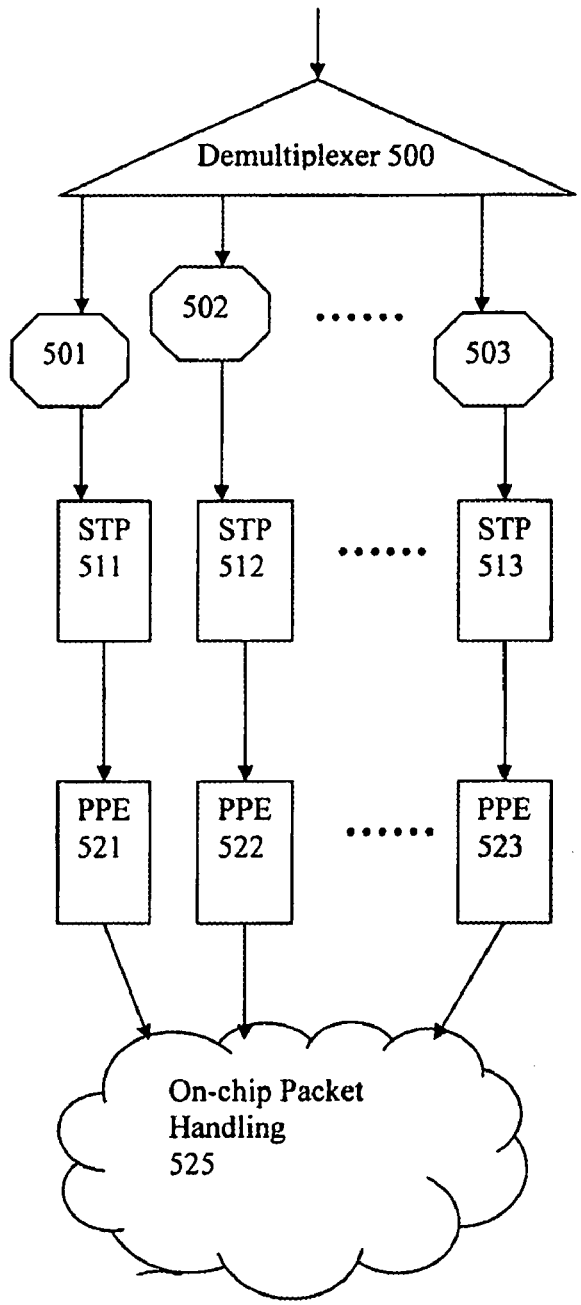
FIG. 13 illustrates a portion of a reconfigurable integrated photonic-electronic circuit chip with an interface that may support very fast packet-based data transfer rates onto the chip.

FIG. 13 illustrates a portion of a reconfigurable integrated photonic-electronic circuit chip with an interface that may support very fast packet-based data transfer rates onto the chip. In this example, a multiwavelength optical signal is demultiplexed into N wavelengths at demultiplexer 500 and transmitted to N detectors 501, 502 . . . 503 via on-chip silicon containing optical waveguides. Detectors 501, 502 . . . 503 convert the optical signals into electronic signals and transmit the electrical signals to N serial-to-parallel (STP) circuits 511, 512 . . . 513. The electrical signals are then transmitted from the STP circuits 511, 512 . . . 513 to packet protocol engines (PPEs) 521, 522 . . . 523 via electrical buses that are an integral number of bits wide. The PPEs 521, 522 . . . 523 transmit the electrical signals to on-chip packet handling circuitry 525 via buses that are an integral number of bits wide. The on-chip packet handling circuitry may support a variety of functions such as, but not limited to, packet switching, packet routing, interfacing to processors, and/or converting protocols.

Figure 14:
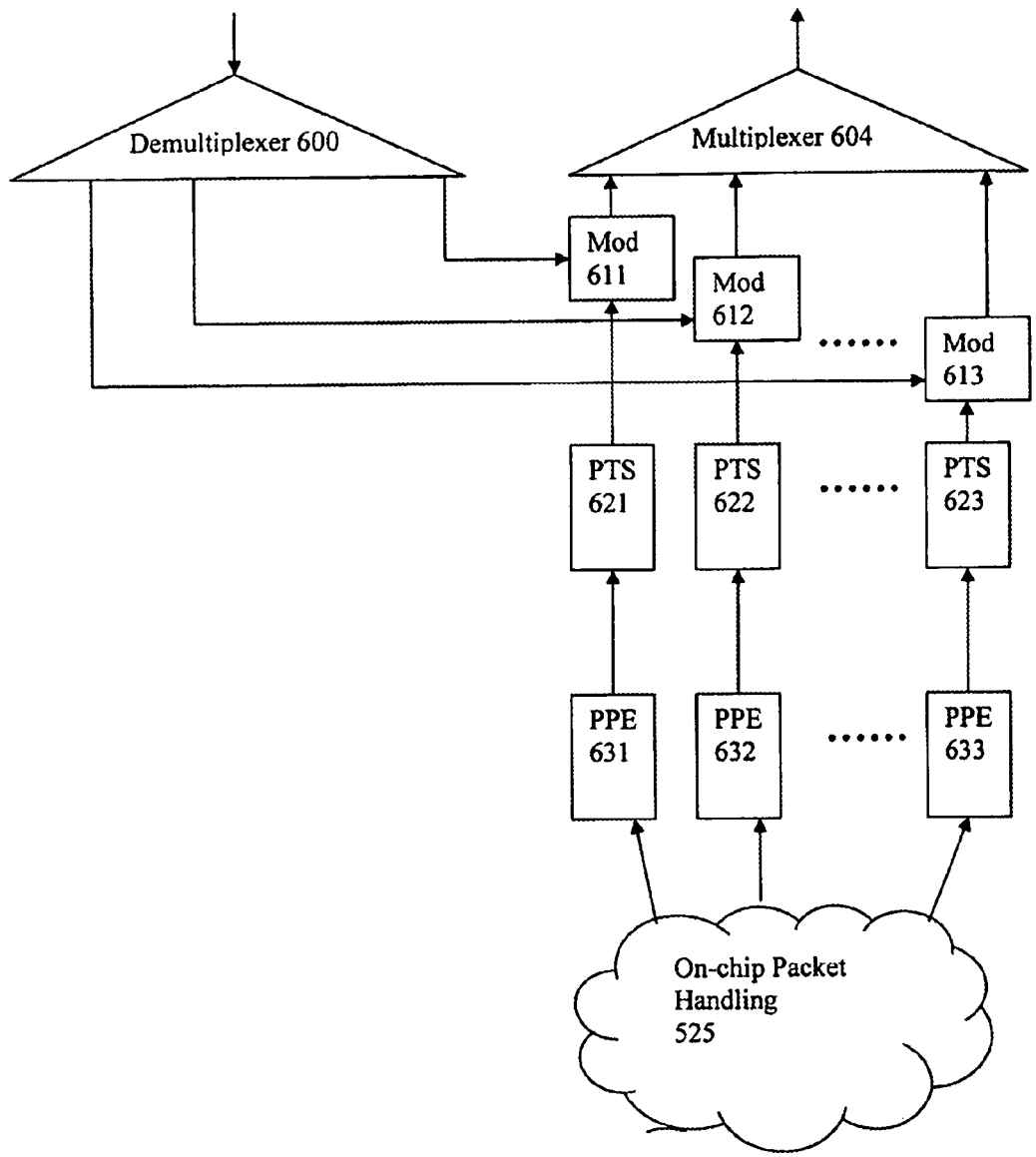
FIG. 14 illustrates a portion of a reconfigurable integrated photonic-electronic circuit chip with an interface that may support very fast packet-based data transfer rates off of the chip.

FIG. 14 illustrates a portion of a reconfigurable integrated photonic-electronic circuit chip with an interface that may support very fast packet-based data transfer rates off of the chip. In this example, a multiwavelength external optical power supply is demultiplexed into a N wavelengths at demultiplexer 600 and transmitted to N modulators 611, 612 . . . 613 via on-chip silicon containing optical waveguides. Electrical data signals are received at packet protocol engines (PPEs) 631, 632 . . . 633 via electrical buses that are an integral number of bits wide. PPEs 631, 632 . . . 633 format the data signals into packets according to the configured protocols and transmit the packets to parallel-to-serial (PTS) circuits 621, 622 . . . 623. PTS circuits 621, 622 . . . 623 receive the packets via electrical buses that are an integral number of bits wide, serialize the signals and transmit serialized electrical signals to modulators 611, 612 . . . 613. Modulators 611, 612 . . . 613 are powered by the optical power provided through demultiplexer 600. Modulators 611, 612 . . . 613 transmit optical signals to multiplexer 604 through on-chip waveguides. Multiplexer 604 multiplexes the optical signals from multiple modulators together and prepares the multiplexed signal for transmission off-chip. By implementing reconfigurable integrated photonic-electronic circuits with a packet-based interface as illustrated in FIGS. 13 and 14 on the same chip, a very fast two-way packet-based optical interface may be established on a chip. Furthermore, by implementing multiple packet-based interfaces on the same photonic-electronic circuit chip, very fast and/or sophisticated routers and/or gateways may be implemented on a single chip.

Integrated photonic-electronic circuit chips may be incorporated into Multi-chip module (MCM) systems wherein the MCM systems include optical inputs, outputs and/or interconnects. According to the current invention, a design tool may be used to plan MCM systems containing integrated photonic-electronic circuit chips. Optionally, the planning tool may support the integration of purely optical chips and/or purely electronic chips in the same MCM. For example, in some cases, a MCM planning system may optimize the layout of integrated photonic-electronic circuit chips in a MCM based on one or more criteria such as chip spacing, routing area on the MCM and chip area considerations. Furthermore, in some cases, the MCM planning system may identify chip-to-chip interconnects best implemented using electrical interconnects and chip-to-chip interconnects best implemented using optical interconnects based on one or more criteria such as chip-to-chip spacing, routing area on the MCM and chip area. For example, a recommendation for establishing an electrical interconnection to support a low bandwidth interconnect between two closely spaced chips may be suggested, whereas an optical interconnect may be suggested to support a high bandwidth interconnect between two widely spaced chips.

Figure 15:
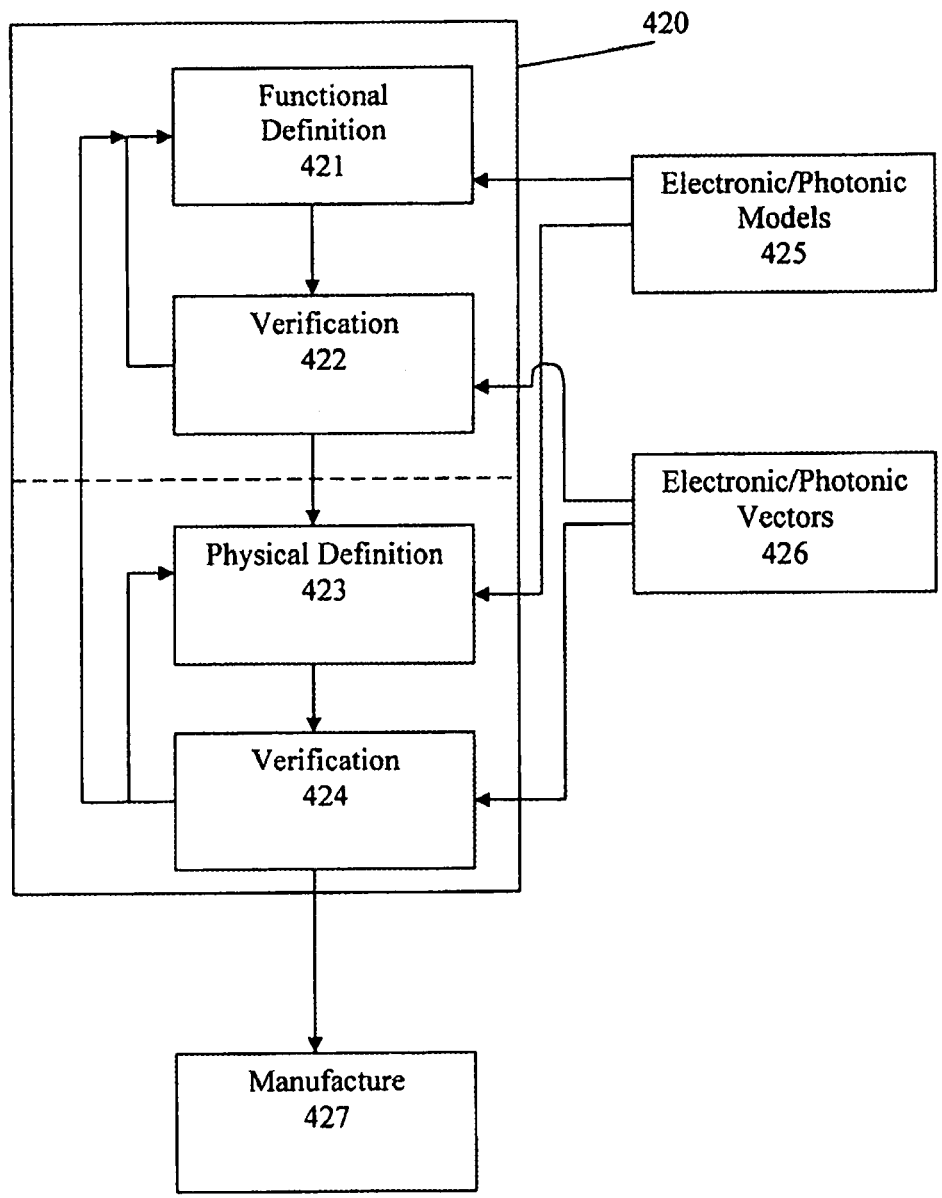
FIG. 15 shows integrated photonic-electronic design automation tool.

FIG. 15 shows integrated photonic-electronic design automation tool 420. Design tool 420 may be implemented in stand-alone or networked software and/or hardware for generating prototype design file to tape-out for chip, photomask, module, board, hybrid or system manufacturing 427. Tool 420 enables functional or logic definition 421 to provide high-level description, netlist, register-transfer level or other system or functional syntax to define mixed photonic and electronic circuit design, for example, by using electronic/photonic component or interconnect models provided in storage or reusable library 425. Then, tool 420 applies simulator 422 using electronic/photonic simulation or test vectors to verify functional definition for user approval or modification by redefining or reconfiguring function 421.

Furthermore, tool 420 enables physical or placement definition 423 to specify actual place and route parameters for the prototype design, as well as apply simulator 424 using electronic/photonic simulation or test vectors to verify physical definition for user approval or modification by redefining or reconfiguring function 421 or physical attributes 423.

Foregoing descriptions of specific embodiments of the invention have been presented for purposes of illustration and description. They are not intended to be exhaustive or to limit the invention to the precise forms disclosed. Modifications and variations are possible in light of the above teaching. For example, applicants contemplate that present invention may be applied for various design applications or purposes, such as microelectromechanical (MEMs) devices for biometric or sensing applications for homeland security and defense or anti-terrorist surveillance systems, methods or control functions.

The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

We claim:

1. An integrated photonic-electronic circuit comprising:
    an electronic circuit portion comprising a transistor logic module comprising at least one group IV semiconductor layer; and
    a photonic interface comprising silicon, wherein the photonic interface comprises a coupler for coupling the electronic circuit portion to one or more optical fibers and wherein said photonic interface is at least partially transparent to light with an energy less than the bandgap energy of the group IV semiconductor layer;
    wherein said integrated photonic-electronic circuit is integrated on a single chip.

2. The integrated photonic-electronic circuit of claim 1 wherein:
    the group IV semiconductor layer comprises silicon.

3. The integrated photonic-electronic circuit of claim 1 wherein:
    the group IV semiconductor layer comprises germanium.

4. The integrated photonic-electronic circuit of claim 1 wherein:
    the portion of the photonic interface that is at least partially transparent to light with an energy less than the bandgap energy of the group IV semiconductor layer comprises:
    elemental silicon.

5. The integrated photonic-electronic circuit of claim 1 wherein:
    the single chip is a silicon substrate, silicon on quartz substrate, silicon on sapphire (SOS) substrate or silicon on insulator (SOI) substrate.

6. The integrated photonic-electronic circuit of claim 1 wherein:
    the coupler comprises one or more receivers for receiving optical signals from one or more of the optical fibers.

7. The integrated photonic-electronic circuit of claim 6 wherein:
    the receiver comprises one or more broad-band couplers.

8. The integrated photonic-electronic circuit of claim 6 wherein:
    the receiver comprises one or more detectors.

9. The integrated photonic-electronic circuit of claim 6 wherein:
    the receiver further comprises one or more optical filters.

10. The integrated photonic-electronic circuit of claim 9 wherein:
    the optical filter is an optical demultiplexer, a waveguide based filter, an Arrayed WaveGuide (AWG) demultiplexer, ring resonator demultiplexer or an add/drop filter.

11. The integrated photonic-electronic circuit of claim 1 wherein the coupler comprises one or more transmitters for transmitting optical signals to one or more of the optical fibers.

12. The integrated photonic-electronic circuit of claim 11 wherein:
    the transmitter comprises one or more modulators.

13. The integrated photonic-electronic circuit of claim 11 wherein:
    the transmitter comprises one or more broad-band couplers.

14. The integrated photonic-electronic circuit of claim 11 wherein:
    the transmitter further comprises one or more optical filters.

15. The integrated photonic-electronic circuit of claim 14 wherein:
    the optical filter is an optical demultiplexer, a waveguide based filter, an Arrayed WaveGuide (AWG) demultiplexer, ring resonator demultiplexer, an add/drop filter, an optical multiplexer, an Arrayed WaveGuide multiplexer or a ring resonator multiplexer.

16. The integrated photonic-electronic circuit of claim 11 wherein:
    the transmitter further comprises an optical power receiver for receiving optical power from an external optical power source.

17. The integrated photonic-electronic circuit of claim 16 wherein:
    the external optical power source may comprise a substantially coherent light source.

18. The integrated photonic-electronic circuit of claim 16 wherein:
    the external optical power source may comprise a partially incoherent light source.

19. The integrated photonic-electronic circuit of claim 16 wherein:
    the external optical power source may comprise a single wavelength light source.

20. The integrated photonic-electronic circuit of claim 16 wherein:
    the external optical power source may comprise a multiple wavelength light source.

21. The integrated photonic-electronic circuit of claim 1 wherein:
    light may be transmitted through the integrated photonic-electronic circuit through waveguides comprised of silicon.

22. The integrated photonic-electronic circuit of claim 21 wherein:
    the waveguides comprised of silicon are substantially in the plane of the chip.

23. The integrated photonic-electronic circuit of claim 1 wherein:
    the electronic circuit portion comprises a processor.

24. An integrated photonic-electronic circuit comprising:
    an electronic circuit portion comprising at least one group IV semiconductor layer, wherein the electronic circuit portion comprises a device selected from the group consisting of: a field programmable gate array (FPGA), a Programmable Logic Devices (PLD), or a Complex Programmable Logic Devices (CPLD); and
    a photonic interface comprising silicon, wherein the photonic interface comprises a coupler for coupling the electronic circuit portion to one or more optical fibers and wherein said photonic interface is at least partially transparent to light with an energy less than the bandgap energy of the group IV semiconductor layer;
    wherein said integrated photonic-electronic circuit is integrated on a single chip.

25. An integrated photonic-electronic circuit comprising:
    an electronic circuit portion comprising at least one group IV semiconductor layer, wherein the electronic circuit portion comprises a memory module; and
    a photonic interface comprising silicon, wherein the photonic interface comprises a coupler for coupling the electronic circuit portion to one or more optical fibers and wherein said photonic interface is at least partially transparent to light with an energy less than the bandgap energy of the group IV semiconductor layer;
    wherein said integrated photonic-electronic circuit is integrated on a single chip.

26. The integrated photonic-electronic circuit of claim 1 wherein:
  the electronic circuit portion comprises analog circuits.
27. The integrated photonic-electronic circuit of claim 1 wherein:
  the electronic circuit portion comprises radio frequency (RF) circuits.
28. An integrated photonic-electronic circuit comprising:
  an electronic circuit portion comprising at least one group IV semiconductor layer, wherein the electronic circuit portion comprises Complementary Metal Oxide Semiconductor (CMOS) circuits; and
  a photonic interface comprising silicon, wherein the photonic interface comprises a coupler for coupling the electronic circuit portion to one or more optical fibers and wherein said photonic interface is at least partially transparent to light with an energy less than the bandgap energy of the group IV semiconductor layer;
    wherein said integrated photonic-electronic circuit is integrated on a single chip.
29. An integrated photonic-electronic circuit comprising:
  an electronic circuit portion comprising at least one group IV semiconductor layer, wherein the electronic circuit portion comprises Bipolar Complementary Metal Oxide Semiconductor (Bi-CMOS) circuits; and
  a photonic interface comprising silicon, wherein the photonic interface comprises a coupler for coupling the electronic circuit portion to one or more optical fibers and wherein said photonic interface is at least partially transparent to light with an energy less than the bandgap energy of the group IV semiconductor layer;
    wherein said integrated photonic-electronic circuit is integrated on a single chip.
30. An integrated photonic-electronic circuit comprising:
  an electronic circuit portion comprising at least one group IV semiconductor layer, wherein the electronic circuit portion comprises Hetero-Junction Bipolar Transistor (HBT) circuits; and
  a photonic interface comprising silicon, wherein the photonic interface comprises a coupler for coupling the electronic circuit portion to one or more optical fibers and wherein said photonic interface is at least partially transparent to light with an energy less than the bandgap energy of the group IV semiconductor layer;
    wherein said integrated photonic-electronic circuit is integrated on a single chip.
31. An integrated photonic-electronic circuit comprising:
  an electronic circuit portion comprising at least one group IV semiconductor layer, wherein the electronic circuit portion comprises a memory controller; and
  a photonic interface comprising silicon, wherein the photonic interface comprises a coupler for coupling the electronic circuit portion to one or more optical fibers and wherein said photonic interface is at least partially transparent to light with an energy less than the bandgap energy of the group IV semiconductor layer;
    wherein said integrated photonic-electronic circuit is integrated on a single chip.
32. An integrated photonic-electronic circuit comprising:
  an electronic circuit portion comprising at least one group IV semiconductor layer; and
  a photonic interface comprising silicon, wherein the photonic interface comprises a coupler for coupling the electronic circuit portion to one or more optical fibers and wherein said photonic interface is at least partially transparent to light with an energy less than the bandgap energy of the group IV semiconductor layer;
    wherein the integrated photonic-electronic circuit is integrated on a single chip and is reconfigurable.
33. The integrated photonic-electronic circuit of claim 32 wherein:
  the photonic interface is reconfigurable.
34. The integrated photonic-electronic circuit of claim 32 wherein:
  the integrated photonic-electronic circuit is remotely reconfigurable.
35. The integrated photonic-electronic circuit of claim 32 wherein:
  the integrated photonic-electronic circuit is self-reconfiguring.
36. The integrated photonic-electronic circuit of claim 1 wherein:
  the integrated photonic-electronic circuit is introspective.
37. The integrated photonic-electronic circuit of claim 1 wherein:
  one or more of the optical fibers may be coupled to the top surface of the integrated photonic-electronic circuit.
38. The integrated photonic-electronic circuit of claim 1 wherein:
  one or more of the optical fibers may be coupled to the backside surface of the integrated photonic-electronic circuit.
39. The integrated photonic-electronic circuit of claim 1 wherein:
  one or more of the optical fibers may be coupled to the edge of the integrated photonic-electronic circuit.
40. The integrated photonic-electronic circuit of claim 1 wherein:
  one or more of the optical fibers may be coupled to a surface of the integrated photonic-electronic circuit through a grating coupler.
41. The integrated photonic-electronic circuit of claim 1 further comprising:
  one or more electronic interfaces for electronically coupling to one or more electronic interconnects.
42. An integrated photonic-electronic circuit comprising:
  an electronic circuit portion comprising a transistor logic module comprising at least one group IV semiconductor layer; and
  a photonic interface comprising silicon, wherein the photonic interface comprises a coupler for coupling the electronic circuit portion to one or more optical ports and wherein said coupler may process light substantially in the plane of the circuit;
    wherein said integrated photonic-electronic circuit is integrated on a single chip.
43. The integrated photonic-electronic circuit of claim 42 wherein:
  the group IV semiconductor layer comprises silicon.
44. The integrated photonic-electronic circuit of claim 42 wherein:
  the group IV semiconductor layer comprises germanium.
45. The integrated photonic-electronic circuit of claim 42 wherein:
  the single chip is a silicon substrate, silicon on quartz substrate, silicon on sapphire (SOS) substrate or silicon on insulator (SOI) substrate.
46. The integrated photonic-electronic circuit of claim 42 wherein:
  the coupler comprises one or more receivers for receiving optical signals from one or more of the optical ports.
47. The integrated photonic-electronic circuit of claim 46 wherein:
  the receiver comprises one or more broad-band couplers.

48. The integrated photonic-electronic circuit of claim 46 wherein:
the receiver comprises one or more detectors.

49. The integrated photonic-electronic circuit of claim 46 wherein:
the receiver further comprises one or more optical filters.

50. The integrated photonic-electronic circuit of claim 49 wherein:
the optical filter is an optical demultiplexer, a waveguide based filter, an Arrayed WaveGuide (AWG) demultiplexer, ring resonator demultiplexer or an add/drop filter.

51. The integrated photonic-electronic circuit of claim 42 wherein the coupler comprises one or more transmitters for transmitting optical signals to one or more of the optical ports.

52. The integrated photonic-electronic circuit of claim 51 wherein:
the transmitter comprises one or more modulators.

53. The integrated photonic-electronic circuit of claim 51 wherein:
the transmitter comprises one or more broad-band couplers.

54. The integrated photonic-electronic circuit of claim 51 wherein:
the transmitter further comprises one or more optical filters.

55. The integrated photonic-electronic circuit of claim 54 wherein:
the optical filter is an optical demultiplexer, a waveguide based filter, an Arrayed WaveGuide (AWG) demultiplexer, ring resonator demultiplexer, an add/drop filter, an optical multiplexer, an Arrayed WaveGuide multiplexer or an ring resonator multiplexer.

56. The integrated photonic-electronic circuit of claim 51 wherein:
the transmitter further comprises an optical power receiver for receiving optical power from an external optical power source.

57. The integrated photonic-electronic circuit of claim 56 wherein:
the external optical power source may comprise a substantially coherent light source.

58. The integrated photonic-electronic circuit of claim 56 wherein:
the external optical power source may comprise a partially incoherent light source.

59. The integrated photonic-electronic circuit of claim 56 wherein:
the external optical power source may comprise a single wavelength light source.

60. The integrated photonic-electronic circuit of claim 56 wherein:
the external optical power source may comprise a multiple wavelength light source.

61. The integrated photonic-electronic circuit of claim 42 wherein:
light may be transmitted through the integrated photonic-electronic circuit through waveguides comprised of silicon.

62. The integrated photonic-electronic circuit of claim 61 wherein:
the waveguides comprised of silicon are substantially in the plane of the chip.

63. The integrated photonic-electronic circuit of claim 42 wherein:
the electronic circuit portion comprises a processor.

64. An integrated photonic-electronic circuit comprising:
an electronic circuit portion comprising at least one group IV semiconductor layer, wherein the electronic circuit portion comprises a device selected from the group consisting of: a field programmable gate array (FPGA), a Programmable Logic Devices (PLD), or a Complex Programmable Logic Devices (CPLD); and
a photonic interface comprising silicon, wherein the photonic interface comprises a coupler for coupling the electronic circuit portion to one or more optical ports and wherein said coupler may process light substantially in the plane of the circuit;
wherein said integrated photonic-electronic circuit is integrated on a single chip.

65. An integrated photonic-electronic circuit comprising:
an electronic circuit portion comprising at least one group IV semiconductor layer, wherein the electronic circuit portion comprises a memory module; and
a photonic interface comprising silicon, wherein the photonic interface comprises a coupler for coupling the electronic circuit portion to one or more optical ports and wherein said coupler processes light substantially in the plane of the circuit;
wherein said integrated photonic-electronic circuit is integrated on a single chip.

66. The integrated photonic-electronic circuit of claim 42 wherein:
the electronic circuit portion comprises analog circuits.

67. The integrated photonic-electronic circuit of claim 42 wherein:
the electronic circuit portion comprises radio frequency (RF) circuits.

68. An integrated photonic-electronic circuit comprising:
an electronic circuit portion comprising at least one group IV semiconductor layer, wherein the electronic circuit portion comprises Complementary Metal Oxide Semiconductor (CMOS) circuits; and
a photonic interface comprising silicon, wherein the photonic interface comprises a coupler for coupling the electronic circuit portion to one or more optical ports and wherein said coupler processes light substantially in the plane of the circuit;
wherein said integrated photonic-electronic circuit is integrated on a single chip.

69. An integrated photonic-electronic circuit comprising:
an electronic circuit portion comprising at least one group IV semiconductor layer, wherein the electronic circuit portion comprises Bipolar Complementary Metal Oxide Semiconductor (Bi-CMOS) circuits; and
a photonic interface comprising silicon, wherein the photonic interface comprises a coupler for coupling the electronic circuit portion to one or more optical ports and wherein said coupler processes light substantially in the plane of the circuit;
wherein said integrated photonic-electronic circuit is integrated on a single chip.

70. An integrated photonic-electronic circuit comprising:
an electronic circuit portion comprising at least one group IV semiconductor layer, wherein the electronic circuit portion comprises Hetero-Junction Bipolar Transistor (HBT) circuits; and
a photonic interface comprising silicon, wherein the photonic interface comprises a coupler for coupling the electronic circuit portion to one or more optical ports and wherein said coupler processes light substantially in the plane of the circuit;

wherein said integrated photonic-electronic circuit is integrated on a single chip.

71. An integrated photonic-electronic circuit comprising:
an electronic circuit portion comprising at least one group V semiconductor layer, wherein the electronic circuit portion comprises a memory controller; and
a photonic interface comprising silicon, wherein the photonic interface comprises a coupler for coupling the electronic circuit portion to one or more optical ports and wherein said coupler processes light substantially in the plane of the circuit;
wherein said integrated photonic-electronic circuit is integrated on a single chip.

72. An integrated photonic-electronic circuit comprising:
an electronic circuit portion comprising at least one group IV semiconductor layer; and
a photonic interface comprising silicon, wherein the photonic interface comprises a coupler for coupling the electronic circuit portion to one or more optical ports and wherein said coupler processes light substantially in the plane of the circuit;
wherein the integrated photonic-electronic circuit is integrated on a single chip and is reconfigurable.

73. The integrated photonic-electronic circuit of claim 72 wherein:
the photonic interface is reconfigurable.

74. The integrated photonic-electronic circuit of claim 72 wherein:
the integrated photonic-electronic circuit is remotely reconfigurable.

75. The integrated photonic-electronic circuit of claim 72 wherein:
the integrated photonic-electronic circuit is self-reconfiguring.

76. The integrated photonic-electronic circuit of claim 42 wherein:
the integrated photonic-electronic circuit is introspective.

77. The integrated photonic-electronic circuit of claim 42 wherein:
one or more of the optical ports may be disposed on the top surface of the integrated photonic-electronic circuit.

78. The integrated photonic-electronic circuit of claim 42 wherein:
one or more of the optical ports may be coupled to one or more optical fibers.

79. The integrated photonic-electronic circuit of claim 42 wherein:
one or more of the optical ports may be disposed on the backside surface of the integrated photonic-electronic circuit.

80. The integrated photonic-electronic circuit of claim 42 wherein:
one or more of the optical ports may be disposed on an edge of the integrated photonic-electronic circuit.

81. The integrated photonic-electronic circuit of claim 42 wherein:
one or more of the optical ports may be coupled to optical fiber through a grating coupler disposed on a surface of the integrated photonic-electronic circuit.

82. The integrated photonic-electronic circuit of claim 42 further comprising:
one or more electronic interfaces for electronically coupling to one or more electronic interconnects.

* * * * *